US008538031B2

(12) United States Patent
Purnhagen et al.

(10) Patent No.: US 8,538,031 B2
(45) **Date of Patent: *Sep. 17, 2013**

(54) METHOD FOR REPRESENTING MULTI-CHANNEL AUDIO SIGNALS

(75) Inventors: Heiko Purnhagen, Sundbyberg (SE); Lars Villemoes, Jaerfaella (SE); Jonas Engdegard, Stockholm (SE); Jonas Roeden, Solna (SE); Kristofer Kjoerling, Solna (SE)

(73) Assignee: Dolby International AB, Amsterdam Zuid-Oost (NL)

( * ) Notice: Subject to any disclaimer, the term of this patent is extended or adjusted under 35 U.S.C. 154(b) by 79 days.

This patent is subject to a terminal disclaimer.

(21) Appl. No.: 12/882,894

(22) Filed: Sep. 15, 2010

(65) Prior Publication Data

US 2011/0002470 A1 Jan. 6, 2011

Related U.S. Application Data

(60) Division of application No. 11/549,963, filed on Oct. 16, 2006, now Pat. No. 7,986,789, which is a continuation of application No. PCT/EP2005/003849, filed on Apr. 12, 2005.

(30) Foreign Application Priority Data

Apr. 16, 2004 (SE) ........................................ 0400998

(51) Int. Cl.
*H04R 5/00* (2006.01)
*G06F 17/00* (2006.01)

(52) U.S. Cl.
USPC ................................................ 381/23; 700/94

(58) Field of Classification Search
USPC ........................................ 381/19–22; 700/94
See application file for complete search history.

(56) References Cited

U.S. PATENT DOCUMENTS 5,291,557 A * 3/1994 Davis et al. ..................... 381/22
5,583,962 A 12/1996 Davis (Continued)

FOREIGN PATENT DOCUMENTS

JP 05505298 8/1993
JP 09-505193 5/1997

(Continued)

OTHER PUBLICATIONS

Baumgarte, et al.; "Binaural Cue Coding—Part I: Psychoacoustic fundamentals and Design Principles"; Nov. 2003; IEEE Transactions on Speech and Autio Processing, vol. 11 No. 6, 11 pages.

(Continued)

*Primary Examiner* — Ping Lee
(74) *Attorney, Agent, or Firm* — Perkins Coie LLP; Michael A. Glenn

(57) ABSTRACT

A multi-channel input signal having at least three original channels is represented by a parameter representation of the multi-channel signal. A first balance parameter, a first coherence parameter, or a first inter-channel time difference between a first channel pair and a second balance parameter, or a second coherence parameter, or a second inter-channel time difference parameter between a second channel pair are calculated. This set of parameters is the parameter representation of the original signals. The first channel pair has two channels, which are different from two channels of a second channel pair. Furthermore, each channel of the two channel pairs is one of the original channels, or a weighted combination of the original channels, and the first channel pair and the second channel pair include information on the three original channels. For multi-channel reconstruction purposes, the parameters are used in addition to down-mixing information to generate a selectable number of output channels in a scalable fashion.

19 Claims, 10 Drawing Sheets

Balance parameter:

$$r_1 = \frac{L}{R} = \frac{\alpha^2 B + \beta^2 A + \gamma^2 C + \delta^2 F}{\alpha^2 D + \beta^2 E + \gamma^2 C + \delta^2 F} \quad \text{or} \quad r_1 = \frac{B}{D}$$

$$r_2 = \frac{\gamma^2 2C}{\alpha^2 (B+D)}$$

$$r_3 = \frac{\beta^2 (A+E)}{\alpha^2 (B+D) + \gamma^2 2C}$$

$$r_4 = \frac{\beta^2 A}{\beta^2 E} = \frac{A}{E}$$

$$r_5 = \frac{\delta^2 2F}{\alpha^2 (B+D) + \beta^2 (A+E) + \gamma^2 2C}$$

(56) References Cited

U.S. PATENT DOCUMENTS

| | | | |
|---|---|---|---|
| 5,859,826 A | 1/1999 | Ueno et al. |
| 7,292,901 B2 | 11/2007 | Baumgarte et al. |
| 7,447,629 B2 | 11/2008 | Breebaart |
| 7,508,947 B2 | 3/2009 | Smithers |
| 7,805,313 B2 | 9/2010 | Faller et al. |
| 8,208,641 B2 | 6/2012 | Oh et al. |
| 8,223,976 B2 | 7/2012 | Purnhagen et al. |
| 2002/0067834 A1 | 6/2002 | Shirayanagi |
| 2005/0157883 A1 | 7/2005 | Herre et al. |
| 2005/0169486 A1 | 8/2005 | Irwan |
| 2011/0075848 A1 | 3/2011 | Purnhagen et al. |

FOREIGN PATENT DOCUMENTS

| | | |
|---|---|---|
| JP | 2001100792 | 4/2001 |
| JP | 2002-175097 | 6/2002 |
| JP | 2002-244698 | 8/2002 |
| JP | 2005523479 | 8/2005 |
| JP | 2005533426 | 11/2005 |
| JP | 2008065169 | 3/2008 |
| TW | 569551 | 1/2004 |
| WO | WO92/12607 | 7/1992 |
| WO | WO 03/007656 | 1/2003 |
| WO | WO 03/090208 A1 | 10/2003 |
| WO | WO 2004/008805 | 1/2004 |
| WO | WO 2004/008865 | 1/2004 |
| WO | WO 2005/025241 A2 | 3/2005 |

OTHER PUBLICATIONS

Faller, C. et al.; "Binaural Cue Coding—Part II: Schemes and Applications"; Nov. 2003; IEEE Transactions on Speech and Audio Processing, vol. 11, No. 6, 12 pages.

Herre, J. et al.; "Intensity Stereo Coding"; Feb. 26-Mar. 1, 1994; AES Convention, Amsterdam, Netherlands, 16 pages.

Johnston, J. et al.; "Sum-difference Stereo Transform Coding"; Mar. 1992; IEEE Acoustics, Speech and Signal Processing, vol. 2, San Francisco, CA, 4 pages.

Faller, C. et al.; "Binaural Cue Coding Applied to Stereo and Multi-Channel Audio Compression"; May 10-13, 2003; AES 112th Convention, Munich, Germany.

Liu, et al.; "A New Intensity Stereo Coding Scheme for MPEG1 Audio Encoder—Layers I and II"; Aug. 1996; IEEE Transactions on Consumer Electronics, vol. 42, No. 3, 5 pages.

Translation of Japanese Office Action for related Japanese application No. 2007-505521; mailing date of Office Action Aug. 18, 2009, 6 pages.

Japanese Office Action, with translation, for related Japanese application No. 2007-505521; mailing date of Office Action Mar. 16, 2010, 9 pages.

* cited by examiner

Balance parameter:

$$r_1 = \frac{L}{R} = \frac{\alpha^2 B + \beta^2 A + \gamma^2 C + \delta^2 F}{\alpha^2 D + \beta^2 E + \gamma^2 C + \delta^2 F} \quad \text{or} \quad r_1 = \frac{B}{D}$$

$$r_2 = \frac{\gamma^2 2C}{\alpha^2 (B + D)}$$

$$r_3 = \frac{\beta^2 (A + E)}{\alpha^2 (B + D) + \gamma^2 2C}$$

$$r4 = \frac{\beta^2 A}{\beta^2 E} = \frac{A}{E}$$

$$r_5 = \frac{\delta^2 2F}{\alpha^2 (B + D) + \beta^2 (A + E) + \gamma^2 2C}$$

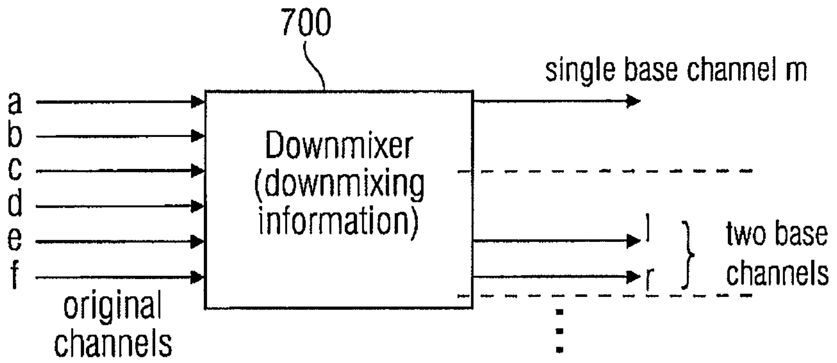

5.1 → two base channels:

$$l_d(t) = \alpha b(t) + \beta a(t) + \gamma c(t) + \delta f(t)$$
$$r_d(t) = \alpha d(t) + \beta e(t) + \gamma c(t) + \delta f(t)$$

5.1 → one base channel:

$$m_d(t) = \sqrt{\frac{1}{2}}\,(l_d(t) + r_d(t)$$

energy of transmitted mono channel:
(per band and per block)

$$M = \frac{1}{2}(\alpha^2(B+D) + \beta^2(A+E) + 2\gamma^2 C + 2\delta^2 F),$$

set of balance parameters for two base channels:

$$q_1 = \frac{\beta^2 A}{L},\ q_2 = \frac{\alpha^2 B}{L},\ q_3 = \frac{\gamma^2 C}{M},\ q_4 = \frac{\alpha^2 D}{R},\ q_2 = \frac{\beta^2 E}{R} \text{ and } q_5 = \frac{\delta^2 F}{M}$$

FIG. 7

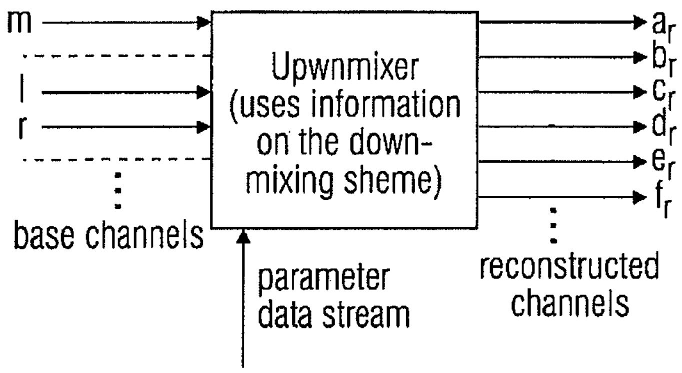

$$F=\frac{1}{2\gamma^2}\frac{r_5}{1+r_5}2M$$

$$C=\frac{1}{2\gamma^2}\frac{r_2}{1+r_2}\frac{1}{1+r_3}\frac{1}{1+r_5}2M$$

$$A=\frac{1}{\beta^2}\frac{r_4}{1+r_4}\frac{r_3}{1+r_3}\frac{1}{1+r_5}2M$$

$$B=\frac{1}{\alpha^2}\left(2\frac{r_1}{1+r_1}M-\beta^2A-\gamma^2C-\delta^2F\right)$$

$$E=\frac{1}{\beta^2}\frac{1}{1+r_4}\frac{r_3}{1+r_3}\frac{1}{1+r_5}2M$$

$$D=\frac{1}{\alpha^2}\left(2\frac{1}{1+r_1}M-\beta^2E-\gamma^2C-\delta^2F\right)$$

OR for $r_1=\frac{B}{D}$:

$$B=\frac{1}{\alpha^2}\frac{r_1}{1+r_1}\frac{1}{1+r_2}\frac{1}{1+r_3}\frac{1}{1+r_5}2M$$

$$D=\frac{1}{\alpha^2}\frac{1}{1+r_1}\frac{1}{1+r_2}\frac{1}{1+r_3}\frac{1}{1+r_5}2M$$

FIG. 8

| | Parameter to be extr. | reconstr. ch. | not used/ calculated |
|---|---|---|---|
| 2 from 1 | $r_1$ / $r_2$ | B, D / (C+F), (B+D) | r2-r5<br>A, C, E, F |
| 3 from 1 | $r_1$, $r_2$ | B, D, (C+F) | $r_3$-$r_5$<br>A, E, F |
| 4 from 1 | $r_1$, $r_2$, $r_3$ | B, D, (C+F), (A+E) | $r_4$, $r_5$<br>A, E, F |
| 5 from 1 | $r_1$, $r_2$, $r_3$, $r_4$ | B, D, (C+F), A, E | $r_5$<br>F |
| 5.1 from 1 | $r_1$, $r_2$, $r_3$, $r_4$, $r_5$ | B, D, C, A, E, F | / |
| 5.1 from 2 | $r_2$, $r_3$, $r_4$, $r_5$ | B, D, C, A, E, F | $r_1$ |

METHOD FOR REPRESENTING MULTI-CHANNEL AUDIO SIGNALS

CROSS-REFERENCE TO RELATED APPLICATION

This application is a divisional of U.S. patent application Ser. No. 11/549,963, filed Oct. 16, 2006 now U.S. Pat. No. 7,986,789 which is a continuation of International Application No. PCT/EP2005/003849, filed Apr. 12, 2005, which designated the United States, and claims priority to Swedish Patent Application No. 0400998-1 filed Apr. 16, 2004, all of which are incorporated herein by reference in its entirety.

BACKGROUND OF THE INVENTION

1. Field of the Invention

The present invention relates to coding of multi-channel representations of audio signals using spatial parameters. The present invention teaches new methods for estimating and defining proper parameters for recreating a multi-channel signal from a number of channels being less than the number of output channels. In particular it aims at minimizing the bit rate for the multi-channel representation, and providing a coded representation of the multi-channel signal enabling easy encoding and decoding of the data for all possible channel configurations.

2. Description of the Related Art

It has been shown in PCT/SE02/01372 "Efficient and scalable Parametric Stereo Coding for Low Bit rate Audio Coding Applications", that it is possible to re-create a stereo image that closely resembles the original stereo image, from a mono signal given a very compact representation of the stereo image. The basic principle is to divide the input signal into frequency bands and time segments, and for these frequency bands and time segments, estimate inter-channel intensity difference (IID), and inter-channel coherence (ICC). The first parameter is a measurement of the power distribution between the two channels in the specific frequency band and the second parameter is an estimation of the correlation between the two channels for the specific frequency band. On the decoder side the stereo image is recreated from the mono signal by distributing the mono signal between the two output channels in accordance with the IID-data, and by adding a decorrelated signal in order to retain the channel correlation of the original stereo channels.

For a multi-channel case (multi-channel in this context meaning more than two output channels), several additional issues have to be accounted for. Several multi-channel configurations exist. The most commonly known is the 5.1 configuration (center channel, front left/right, surround left/right, and the LFE channel). However, many other configurations exist. From the complete encoder/decoder systems point-of-view, it is desirable to have a system that can use the same parameter set (e.g. IID and ICC) or sub-sets thereof for all channel configurations. ITU-R BS.775 defines several down-mix schemes to be able to obtain a channel configuration comprising fewer channels from a given channel configuration. Instead of always having to decode all channels and rely on a down-mix, it can be desirable to have a multi-channel representation that enables a receiver to extract the parameters relevant for the channel configuration at hand, prior to decoding the channels. Further, a parameter set that is inherently scaleable is desirable from a scalable or embedded coding point of view, where it is e.g. possible to store the data corresponding to the surround channels in an enhancement layer in the bitstream.

Contrary to the above it can also be desirable to be able to use different parameter definitions based on the characteristics of the signal being processed, in order to switch between the parameterization that results in the lowest bit rate overhead for the current signal segment being processed.

Another representation of multi-channel signals using a sum signal or down mix signal and additional parametric side information is known in the art as binaural cue coding (BCC). This technique is described in "Binaural Cue Coding—Part 1: Psycho-Acoustic Fundamentals and Design Principles", IEEE Transactions on Speech and Audio Processing, vol. 11, No. 6, November 2003, F. Baumgarte, C. Faller, and "Binaural Cue Coding. Part II: Schemes and Applications", IEEE Transactions on Speech and Audio Processing vol. 11, No. 6, November 2003, C. Faller and F. Baumgarte.

Generally, binaural cue coding is a method for multi-channel spatial rendering based on one down-mixed audio channel and side information. Several parameters to be calculated by a BCC encoder and to be used by a BCC decoder for audio reconstruction or audio rendering include inter-channel level differences, inter-channel time differences, and inter-channel coherence parameters. These inter-channel cues are the determining factor for the perception of a spatial image. These parameters are given for blocks of time samples of the original multi-channel signal and are also given frequency-selective so that each block of multi-channel signal samples have several cues for several frequency bands. In the general case of C playback channels, the inter-channel level differences and the inter-channel time differences are considered in each subband between pairs of channels, i.e., for each channel relative to a reference channel. One channel is defined as the reference channel for each inter-channel level difference. With the inter-channel level differences and the inter-channel time differences, it is possible to render a source to any direction between one of the loudspeaker pairs of a playback set-up that is used. For determining the width or diffuseness of a rendered source, it is enough to consider one parameter per subband for all audio channels. This parameter is the inter-channel coherence parameter. The width of the rendered source is controlled by modifying the subband signals such that all possible channel pairs have the same inter-channel coherence parameter.

In BCC coding, all inter-channel level differences are determined between the reference channel 1 and any other channel. When, for example, the center channel is determined to be the reference channel, a first inter-channel level difference between the left channel and the centre channel, a second inter-channel level difference between the right channel and the centre channel, a third inter-channel level difference between the left surround channel and the center channel, and a forth inter-channel level difference between the right surround channel and the center channel are calculated. This scenario describes a five-channel scheme. When the five-channel scheme additionally includes a low frequency enhancement channel, which is also known as a "sub-woofer" channel, a fifth inter-channels level difference between the low frequency enhancement channel and the center channel, which is the single reference channel, is calculated.

When reconstructing the original multi-channel using the single down mix channel, which is also termed as the "mono" channel, and the transmitted cues such as ICLD (Interchannel Level Difference), ICTD (Interchannel Time Difference), and ICC (Interchannel Coherence), the spectral coefficients of the mono signal are modified using these cues. The level modification is performed using a positive real number determining the level modification for each spectral coefficient. The inter-channel time difference is generated using a complex number of magnitude of one determining a phase modification for each spectral coefficient. Another function determines the coherence influence. The factors for level modifications of each channel are computed by firstly calculating the factor for the reference channel. The factor for the reference channel is computed such that for each frequency partition, the sum of the power of all channels is the same as the power of the sum signal. Then, based on the level modification factor for the reference channel, the level modification factors for the other channels are calculated using the respective ICLD parameters. Thus, in order to perform BCC synthesis, the level modification factor for the reference channel is to be calculated. For this calculation, all ICLD parameters for a frequency band are necessary. Then, based on this level modification for the single channel, the level modification factors for the other channels, i.e., the channels, which are not the reference channel, can be calculated.

This approach is disadvantageous in that, for a perfect reconstruction, one needs each and every inter-channel level difference. This requirement is even more problematic, when an error-prone transmission channel is present. Each error within a transmitted inter-channel level difference will result in an error in the reconstructed multi-channel signal, since each inter-channel level difference is required to calculate each one of the multi-channel output signal. Additionally, no reconstruction is possible, when an inter-channel level difference has been lost during transmission, although this inter-channel level difference was only necessary for e.g. the left surround channel or the right surround channel, which channels are not so important to multi-channel reconstruction, since most of the information is included in the front left channel, which is subsequently called the left channel, the front right channel, which is subsequently called the right channel, or the center channel. This situation becomes even worse, when the inter-channel level difference of the low frequency enhancement channel has been lost during transmission. In this situation, no or only an erroneous multi-channel reconstruction is possible, although the low frequency enhancement channel is not so decisive for the listeners' listening comfort. Thus, errors in a single inter-channel level difference are propagated to errors within each of the reconstructed output channels.

Additionally, the existing BCC scheme, which is also described in AES convention paper 5574, "Binaural Cue Coding applied to Stereo and Multi-channel Audio Compression", C. Faller, F. Baumgarte, May 10 to 13, 2002, Munich, Germany, is not so well-suited, when an intuitive listening scenario is considered because of the single reference channel. It is not natural for a human being, which is, of course, the ultimate goal of the whole audio processing, that everything is related to a single reference channel. Instead, a human being has two ears, which are positioned at different sides of the human being's head. Thus, a human being's natural listening impression is, whether a signal is balanced more to the left or more to the right, or is balanced between the front and back. Contrary thereto, it is unnatural for a human being to feel whether a certain sound source in the auditory field is in a certain balance between each speaker with respect to a single reference speaker. This divergence between the natural listening impression on the one hand and the mathematical/physical model of BCC on the other hand may lead to negative consequences of the encoding scheme, when bit rate requirements, scalability requirements, flexibility requirements, reconstruction artefact requirements, or error-robustness requirements are considered.

SUMMARY OF THE INVENTION

It is an object of the present invention to provide an improved concept for presenting multi-channel audio signals.

In accordance with a first aspect, the present invention provides an apparatus for generating a parameter representation of a multi-channel input signal having original channels, the original channels including a left channel, a right channel, a center channel, a rear left channel, and a rear right channel, having: a parameter generator for generating a first balance parameter, a first coherence parameter or a first time difference parameter between a first channel pair, for generating a second balance parameter between a second channel pair, and for generating a third balance parameter between a third channel pair, the balance parameters, coherence parameters or time parameters forming the parameter representation, wherein each channel of the two channel pair is one of the original channels or a weighted or unweighted combination of the original channels, and wherein the first balance parameter is a left/right balance parameter, and wherein the first channel pair includes, as a first channel, a left-channel or a left down-mix channel and, as a second channel, a right channel, or a right down-mix channel, wherein the second balance parameter is a center balance parameter and the second channel pair includes, as a first channel, the center channel or a channel combination of original channels including the center channel, and, as a second channel, a channel combination including the left channel and the right channel, and wherein the third balance parameter is a front/back balance parameter and the third channel pair has, as a first channel, a channel combination including the rear-left channel and the rear-right channel and, as a second channel, a channel combination including a left channel and a right channel.

In accordance with a second aspect, the present invention provides an apparatus for generating a reconstructed multi-channel representation of an original multi-channel, signal having original channels the original channels including a left channel, a right channel, a center channel, a rear left channel, and a rear right channel, using one or more base channels generating by converting the original multi-channel signal using a down-mix scheme, and using a first balance parameter, between a first channel pair, a second balance parameter between a second channel pair, and a third balance parameter between a third channel pair, wherein the first balance parameter is a left/right balance parameter, and wherein the first channel pair includes, as a first channel, a left-channel or a left down-mix channel and, as a second channel, a right channel, or a right down-mix channel, wherein the second balance parameter is a center balance parameter and the second channel pair includes, as a first channel, the center channel or a channel combination of original channels including the center channel, and, as a second channel, a channel combination including the left channel and the right channel, and wherein the third balance parameter is a front/back balance parameter and the third channel pair has, as a first channel, a channel combination including the rear-left channel and the rear-right channel and, as a second channel, a channel combination including a left channel and a right channel, the apparatus having: an up-mixer for generating a number of up-mix channels, the number of up-mix channels being greater than the number of base channels and smaller than or equal to a number of original channels, wherein the up-mixer is operative to generate reconstructed channels based on information on the down-mixing scheme and using the first, second, and third balance parameters, wherein the up-mixer is operative to generate a reconstructed center channel based on the second balance parameter, wherein the up-mixer is operative to generate a reconstructed left channel and a reconstructed right channel based on the first parameter, and wherein the up-mixer is operative to reconstruct rear channels using the front/back balance parameter.

In accordance with a third aspect, the present invention provides a method of generating a parameter representation of a multi-channel input signal having original channels, the original channels including a left channel, a right channel, a center channel, a rear left channel, and a rear right channel, with the steps of: generating a first balance parameter, wherein the first balance parameter is a left/right balance parameter, and wherein the first channel pair includes, as a first channel, a left-channel or a left down-mix channel and, as a second channel, a right channel, or a right down-mix channel, generating a second balance parameter, wherein the second balance parameter is a center balance parameter and the second channel pair includes, as a first channel, the center channel or a channel combination of original channels including the center channel, and, as a second channel, a channel combination including the left channel and the right channel, generating a third balance parameter, wherein the third balance parameter is a front/back balance parameter and the third channel pair has, as a first channel, a channel combination including the rear-left channel and the rear-right channel and, as a second channel, a channel combination including a left channel and a right channel, and wherein each channel of the two channel pair is one of the original channels, a weighted or unweighted combination of the original channels, a downmix channel, or a weighted or unweighted combination of at least two downmix channels.

In accordance with a fourth aspect, the present invention provides a method of generating a reconstructed multi-channel representation of an original multi-channel signal having original channels, the original channels including a left channel, a right channel, a center channel, a rear left channel, and a rear right channel, using one or more base channels generating by converting the original multi-channel signal using a down-mix scheme, and using a first balance parameter, between a first channel pair, a second balance parameter between a second channel pair, and a third balance parameter between a third channel pair, wherein the first balance parameter is a left/right balance parameter, and wherein the first channel pair includes, as a first channel, a left-channel or a left down-mix channel and, as a second channel, a right channel, or a right down-mix channel, wherein the second balance parameter is a center balance parameter and the second channel pair includes, as a first channel, the center channel or a channel combination of original channels including the center channel, and, as a second channel, a channel combination including the left channel and the right channel, and wherein the third balance parameter is a front/back balance parameter and the third channel pair having, as a first channel, a channel combination including the rear-left channel and the rear-right channel and, as a second channel, a channel combination including a left channel and a right channel, the method having the steps of: generating a number of up-mix channels, the number of up-mix channels being greater than the number of base channels and smaller than or equal to a number of original channels, wherein the step of generating includes generating reconstructed channels based on information on the down-mixing scheme and using first, second, and third balance parameters, by generating a reconstructed center channel based on the second balance parameter, by generating a reconstructed left channel and a reconstructed right channel based on the first parameter, and by reconstructing rear channels using the front/back balance parameter.

In accordance with a fifth aspect, the present invention provides a computer program having machine-readable instructions for performing, when running on a computer, a method of generating a parameter representation of a multi-channel input signal having original channels, the original channels including a left channel, a right channel, a center channel, a rear left channel, and a rear right channel, with the steps of: generating a first balance parameter, wherein the first balance parameter is a left/right balance parameter, and wherein the first channel pair includes, as a first channel, a left-channel or a left down-mix channel and, as a second channel, a right channel, or a right down-mix channel, generating a second balance parameter, wherein the second balance parameter is a center balance parameter and the second channel pair includes, as a first channel, the center channel or a channel combination of original channels including the center channel, and, as a second channel, a channel combination including the left channel and the right channel, generating a third balance parameter, wherein the third balance parameter is a front/back balance parameter and the third channel pair has, as a first channel, a channel combination including the rear-left channel and the rear-right channel and, as a second channel, a channel combination including a left channel and a right channel, and wherein each channel of the two channel pair is one of the original channels, a weighted or unweighted combination of the original channels, a downmix channel, or a weighted or unweighted combination of at least two downmix channels.

In accordance with a sixth aspect, the present invention provides a computer program having machine-readable instructions for performing, when running on a computer, a method of generating a reconstructed multi-channel representation of an original multi-channel signal having original channels, the original channels including a left channel, a right channel, a center channel, a rear left channel, and a rear right channel, using one or more base channels generating by converting the original multi-channel signal using a down-mix scheme, and using a first balance parameter, between a first channel pair, a second balance parameter between a second channel pair, and a third balance parameter between a third channel pair, wherein the first balance parameter is a left/right balance parameter, and wherein the first channel pair includes, as a first channel, a left-channel or a left down-mix channel and, as a second channel, a right channel, or a right down-mix channel, wherein the second balance parameter is a center balance parameter and the second channel pair includes, as a first channel, the center channel or a channel combination of original channels including the center channel, and, as a second channel, a channel combination including the left channel and the right channel, and wherein the third balance parameter is a front/back balance parameter and the third channel pair having, as a first channel, a channel combination including the rear-left channel and the rear-right channel and, as a second channel, a channel combination including a left channel and a right channel, the method having the steps of: generating a number of up-mix channels, the number of up-mix channels being greater than the number of base channels and smaller than or equal to a number of original channels, wherein the step of generating includes generating reconstructed channels based on information on the down-mixing scheme and using first, second, and third balance parameters, by generating a reconstructed center channel based on the second balance parameter, by generating a reconstructed left channel and a reconstructed right channel based on the first parameter, and by reconstructing rear channels using the front/back balance parameter.

In accordance with a seventh aspect, the present invention provides a parameter representation of a multi-channel input signal having original channels, the original channels including a left channel, a right channel, a center channel, a rear left channel, and a rear right channel, having: a first balance parameter between a first channel pair, a second balance parameter between a second channel pair, and a third balance parameter between a third channel pair, wherein each channel of the two channel pair is one of the original channels, a weighted or unweighted combination of the original channels, a downmix channel, or a weighted or unweighted combination of at least two downmix channels, and wherein the first balance parameter is a left/right balance parameter, and wherein the first channel pair includes, as a first channel, a left-channel or a left down-mix channel and, as a second channel, a right channel, or a right down-mix channel, wherein the second balance parameter is a center balance parameter and the second channel pair includes, as a first channel, the center channel or a channel combination of original channels including the center channel, and, as a second channel, a channel combination including the left channel and the right channel, and wherein the third balance parameter is a front/back balance parameter and the third channel pair has, as a first channel, a channel combination including the rear-left channel and the rear-right channel and, as a second channel, a channel combination including a left channel and a right channel.

The present invention is based on the finding that, for a multi-channel representation, one has to rely on balance parameters between channel pairs. Additionally, it has been found out that a multi-channel signal parameter representation is possible by providing at least two different balance parameters, which indicate a balance between two different channel pairs. In particular, flexibility, scalability, error-robustness, and even bit rate efficiency are the result of the fact that the first channel pair, which is the basis for the first balance parameter is different from the second channel pair, which is the basis for the second balance parameters, wherein the four channels forming these channel pairs are all different from each other.

Thus, the inventive concept departs from the single reference channel concept and uses a multi-balance or super-balance concept, which is more intuitive and more natural for a human being's sound impression. In particular, the channel pairs underlying the first and second balance parameters can include original channels, down-mix channels, or preferably, certain combinations between input channels.

It has been found out that a balance parameter derived from the center channel as the first channel and a sum of the left original channel and the right original channel as the second channel of the channel pair is especially useful for providing an exact energy distribution between the center channel and the left and right channels. It is to be noted in this context that these three channels normally include most information of the audio scene, wherein particularly the left-right stereo localization is not only influenced by the balance between left and right but also by the balance between center and the sum of left and right. This observation is reflected by using this balance parameter in accordance with a preferred embodiment of the present invention.

Preferably, when a single mono down-mix signal is transmitted, it has been found out that, in addition to the center/left plus right balance parameter, a left/right balance parameter, a rear-left/rear-right balance parameter, and a front/back balance parameter are an optimum solution for a bit rate-efficient parameter representation, which is flexible, error-robust, and to a large extent artefact-free.

On the receiver-side, in contrast to BCC synthesis in which each channel is calculated by the transmitted information alone, the inventive multi-balance representation additionally makes use of information on the down-mixing scheme used for generating the down-mix channel(s). Thus, in accordance with the present invention, information on the down-mixing scheme, which is not used in prior art systems, is also used for up-mixing in addition to the balance parameter. The up-mixing operation is, therefore, performed such that the balance between the channels within a reconstructed multi-channel signal forming a channel pair for a balance parameter is determined by the balance parameter.

This concept, i.e., having different channel pairs for different balance parameters, makes it possible to generate some channels without knowledge of each and every transmitted balance parameter. In particular, in accordance with the present invention, the left, right and center channels can be reconstructed without any knowledge on any rear-left/rear-right balance or without any knowledge on a front/back balance. This effect allows the very fine-tuned scalability, since extracting an additional parameter from a bit stream or transmitting an additional balance parameter to a receiver consequently allows the reconstruction of one or more additional channels. This is in contrast to the prior art single-reference system, in which one needed each and every inter-channel level difference for reconstructing all or only a subgroup of all reconstructed output channels.

The inventive concept is also flexible in that the choice of the balance parameters can be adapted to a certain reconstruction environment. When, for example, a five-channel set-up forms the original multi-channel signal set-up, and when a four-channel set-up forms a reconstruction multi-channel set-up, which has only a single surround speaker, which is e.g. positioned behind the listener, a front-back balance parameter allows calculating the combined surround channel without any knowledge on the left surround channel, and the right surround channel. This is in contrast to a single-reference channel system, in which one has to extract an inter-channel level difference for the left surround channel and an inter-channel level difference for the right surround channel from the data stream. Then, one has to calculate the left surround channel and the right surround channel. Finally, one has to add both channels to obtain the single surround speaker channel for a four-channel reproduction set-up. All these steps do not have to be performed in the more-intuitive and more user-directed balance parameter representation, since this representation automatically delivers the combined surround channel because of the balance parameter representation, which is not tied to a single reference channel, but which also allows to use a combination of original channels as a channel of a balance parameter channel pair.

The present invention relates to the problem of a parameterized multi-channel representation of audio signals. It provides an efficient manner to define the proper parameters for the multi-channel representation and also the ability to extract the parameters representing the desired channel configuration without having to decode all channels. The invention further solves the problem of choosing the optimal parameter configuration for a given signal segment in order to minimize the bit rate required to code the spatial parameters for the given signal segment. The present invention also outlines how to apply the decorrelation methods previously only applicable for the two channel case in a general multi-channel environment.

In preferred embodiments, the present invention comprises the following features:

Down-mix the multi-channel signal to a one or two channel representation on the encoders side;

Given the multi-channel signal, define the parameters representing the multi-channel signals, either in a flexible on a per-frame basis in order to minimize bit rate or in order to enable the decoder to extract the channel configuration on a bitstream level;

At the decoder side extract the relevant parameter set given the channel configuration currently supported by the decoder;

Create the required number of mutually decorrelated signals given the present channel configuration;

Recreate the output signals given the parameter set decoded from the bitstream data, and the decorrelated signals.

Definition of a parameterization of the multi-channel audio signal, such that the same parameters or a subset of the parameters can be used irrespective of the channel configuration.

Definition of a parameterization of the multi-channel audio signal, such that the parameters can be used in a scalable coding scheme, where subsets of the parameter set are transmitted in different layers of the scalable stream.

Definition of a parameterization of the multi-channel audio signal, such that the energy reconstruction of the output signals from the decoder is not impaired by the underlying audio codec used to code the downmixed signal.

Switching between different parameterizations of the multi-channel audio signal, such that the bit rate overhead for coding the parameterization is minimized.

Definition of a parameterization of the multi-channel audio signal, in which a parameter is included representing the energy correction factor for the down-mixed signal.

Usage of several mutually decorrelated decorrelators to re-create the multi-channel signal.

Re-create the multi-channel signal from an upmix matrix H that is calculated based on the transmitted parameter set.

BRIEF DESCRIPTION OF THE DRAWINGS

These and other objects and features of the present invention will become clear from the following description taken in conjunction with the accompanying drawings, in which:

FIG. 7 illustrates a schematic set-up for a down-mixing scheme generating a single base channel or two base channels;

FIG. 8 illustrates a schematic representation of an up-mixing scheme, which is based on the inventive balance parameters and information on the down-mixing scheme;

DESCRIPTION OF PREFERRED EMBODIMENTS

The below-described embodiments are merely illustrative for the principles of the present invention on multi-channel representation of audio signals. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In the following description of the present invention outlining how to parameterize IID and ICC parameters, and how to apply them in order to re-create a multi-channel representation of audio signals, it is assumed that all referred signals are subband signals in a filterbank, or some other frequency selective representation of a part of the whole frequency range for the corresponding channel. It is therefore understood, that the present invention is not limited to a specific filterbank, and that the present invention is outlined below for one frequency band of the subband representation of the signal, and that the same operations apply to all of the subband signals.

Although a balance parameter is also termed to be a "inter-channel intensity difference (IID)" parameter, it is to be emphasized that a balance parameter between a channel pair does not necessarily has to be the ratio between the energy or intensity in the first channel of the channel pair and the energy or intensity of the second channel in the channel pair. Generally, the balance parameter indicates the localization of a sound source between the two channels of the channel pair. Although this localization is usually given by energy/level/intensity differences, other characteristics of a signal can be used such as a power measure for both channels or time or frequency envelopes of the channels, etc.

Figure 1:
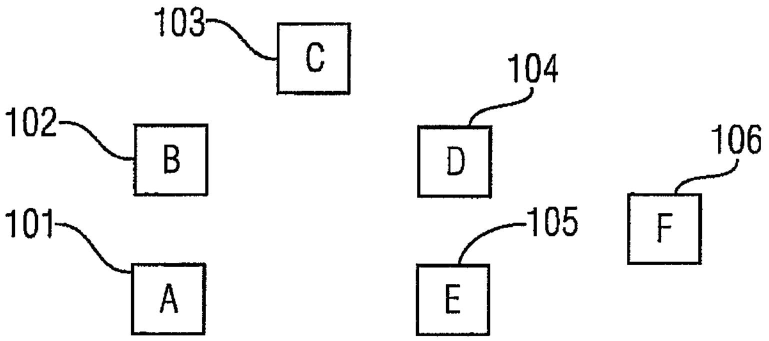
FIG. 1 illustrates a nomenclature used for a 5.1. channel configuration as used in the present invention.

In FIG. 1 the different channels for a 5.1 channel configuration are visualized, where a(t) 101 represents the left surround channel, b(t) 102 represents the left front channel, c(t) 103 represents the center channel, d(t) 104 represents the right front channel, e(t) 105 represents the right surround channel, and f(t) 106 represents the LFE (low frequency effects) channel.

Assuming that we define the expectancy operator as $$E[f(x)] = \frac{1}{T}\int_0^T f(x(t))\,dt$$

and thus the energies for the channels outlined above can be defined according to (here exemplified by the left surround channel):

$$A=E[a^2(t)].$$

The five channels are on the encoder side down-mixed to a two channel representation or a one channel representation. This can be done in several ways, and one commonly used is the ITU down-mix defined according to:

The 5.1 to two channel down-mix:

$$l_d(t)=\alpha b(t)+\beta a(t)+\gamma c(t)+\delta f(t)$$

$$r_d(t)=\alpha d(t)+\beta e(t)+\gamma c(t)+\delta f(t)$$

And the 5.1 to one channel down-mix:

$$m_d(t)=\sqrt{\frac{1}{2}}\,(l_d(t)+r_d(t))$$

Commonly used values for the constants α, β, γ and δ are $$\alpha=1,\ \beta=\gamma=\sqrt{\frac{1}{2}}\ \text{and}\ \delta=0.$$

The IID parameters are defined as energy ratios of two arbitrarily chosen channels or weighted groups of channels. Given the energies of the channels outlined above for the 5.1 channel configuration several sets of IID parameters can be defined.

FIG. 7 indicates a general down-mixer 700 using the above-referenced equations for calculating a single-based channel m or two preferably stereo-based channels $l_d$ and $r_d$. Generally, the down-mixer uses certain down-mixing information. In the preferred embodiment of a linear down-mix, this down-mixing information includes weighting factors α, β, γ, and δ. It is known in the art that more or less constant or non-constant weighting factors can be used.

In an ITU recommended down-mix, α is set to 1, β and γ are set to be equal, and equal to the square root of 0.5, and δ is set to 0. Generally, the factor α can vary between 1.5 and 0.5. Additionally, the factors β, and γ can be different from each other, and vary between 0 and 1. The same is true for the low frequency enhancement channel f(t). The factor δ for this channel can vary between 0 and 1. Additionally, the factors for the left-down mix and the right-down mix do not have to be equal to each other. This becomes clear, when a non-automatic down-mix is considered, which is, for example, performed by a sound engineer. The sound engineer is more directed to perform a creative down-mix rather than a down-mix, which is guided by any mathematic laws. Instead, the sound engineer is guided by his own creative feeling. When this "creative" down-mixing is recorded by a certain parameter set, it will be used in accordance with the present invention by an inventive up-mixer as shown in FIG. 8, which is not only guided by the parameters, but also by additional information on the down-mixing scheme.

When a linear down-mix has been performed as in FIG. 7, the weighting parameters are the preferred information on the down-mixing scheme to be used by the up-mixer. When, however, other information is present, which are used in the down-mixing scheme, this other information can also be used by an up-mixer as the information on the down-mixing scheme. Such other information can, for example, be certain matrix elements or certain factors or functions within matrix elements of an upmix-matrix as, for example, indicated in FIG. 11.

Given the 5.1 channel configuration outlined in FIG. 1 and observing how other channel configurations relate to the 5.1 channel configuration: For a three channel case where no surround channels are available, i.e. B, C, and D are available according to the notation above. For a four channel configuration B, C and D are available but also a combination of A and E representing the single surround channel, or more commonly denoted in this context, the back channel.

The present invention defines IID parameters that apply to all these channels, i.e. the four channel subset of the 5.1. channel configuration has a corresponding subset within the IID parameter set describing the 5.1 channels. The following IID parameter set solves this problem:

$$r_1=\frac{L}{R}=\frac{\alpha^2B+\beta^2A+\gamma^2C+\delta^2F}{\alpha^2D+\beta^2E+\gamma^2C+\delta^2F}$$

$$r_2=\frac{\gamma^2 2C}{\alpha^2(B+D)}$$

$$r_3=\frac{\beta^2(A+E)}{\alpha^2(B+D)+\gamma^2 2C}$$

$$r_4=\frac{\beta^2A}{\beta^2E}=\frac{A}{E}$$

$$r_5=\frac{\delta^2 2F}{\alpha^2(B+D)+\beta^2(A+E)+\gamma^2 2C}$$

It is evident that the $r_1$ parameter corresponds to the energy ratio between the left down-mix channel and the right channel down-mix. The $r_2$ parameter corresponds to the energy ratio between the center channel and the left and right front channels. The $r_3$ parameter corresponds to the energy ratio between the three front channels and the two surround channels. The $r_4$ parameter corresponds to the energy ratio between the two surround channels. The $r_5$ parameter corresponds to the energy ratio between the LFE channel and all other channels.

Figure 4:
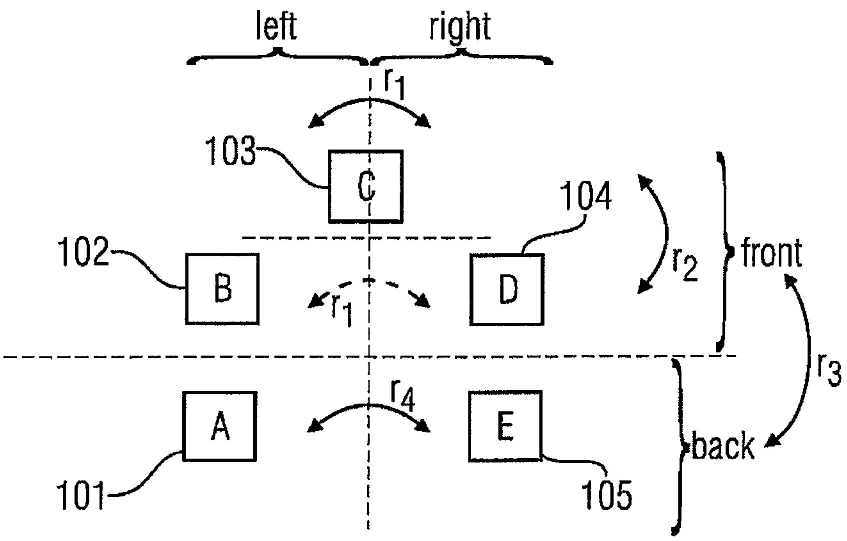
FIG. 4 illustrates one preferred parameterization of the multi-channel signal according to the present invention.

In FIG. 4 the energy ratios as explained above are illustrated. The different output channels are indicated by 101 to 105 and are the same as in FIG. 1 and are hence not elaborated on further here. The speaker set-up is divided into a left and a right half, where the center channel 103 are part of both halves. The energy ratio between the left half plane and the right half plane is exactly the parameter referred to as $r_1$ according to the present invention. This is indicated by the solid line below $r_1$ in FIG. 4. Furthermore, the energy distribution between the center channel 103 and the left front 102 and right front 103 channels are indicated by $r_2$ according to the present invention. Finally, the energy distribution between the entire front channel set-up (102, 103 and 104) and the back channels (101 and 105) are illustrated by the arrow in FIG. 5 by the $r_3$ parameter.

Given the parameterization above and the energy of the transmitted single down-mixed channel:

$$M=\frac{1}{2}(\alpha^2(B+D)+\beta^2(A+E)+2\gamma^2C+2\delta^2F),$$

the energies of the reconstructed channels can be expressed as:

$$F=\frac{1}{2\gamma^2}\frac{r_5}{1+r_5}2M$$

$$A=\frac{1}{\beta^2}\frac{r_4}{1+r_4}\frac{r_3}{1+r_3}\frac{1}{1+r_5}2M$$

$$E=\frac{1}{\beta^2}\frac{r_4}{1+r_4}\frac{r_3}{1+r_3}\frac{1}{1+r_5}2M$$

$$C=\frac{1}{2\gamma^2}\frac{r_2}{1+r_2}\frac{1}{1+r_3}\frac{1}{1+r_5}2M$$

-continued $$B=\frac{1}{\alpha^2}\left(2\frac{r_1}{1+r_1}M-\beta^2A-\gamma^2C-\delta^2F\right)$$

$$D=\frac{1}{\alpha^2}\left(2\frac{1}{1+r_1}M-\beta^2E-\gamma^2C-\delta^2F\right)$$

Hence the energy of the M signal can be distributed to the re-constructed channels resulting in re-constructed channels having the same energies as the original channels.

The above-preferred up-mixing scheme is illustrated in FIG. 8. It becomes clear from the equations for F, A, E, C, B, and D that the information on the down-mixing scheme to be used by the up-mixer are the weighting factors α, β, γ, and δ, which are used for weighting the original channels before such weighted or unweighted channels are added together or subtracted from each other in order to arrive at a number of down-mix channels, which is smaller than the number of original channels. Thus, it is clear from FIG. 8 that in accordance with the present invention, the energies of the reconstructed channels are not only determined by the balance parameters transmitted from an encoder-side to a decoder-side, but are also determined by the down-mixing factor α, β, γ, and δ.

When FIG. 8 is considered, it becomes clear that, for calculating the left and right energies B and D the already calculated channel energies F, A, E, C, are used within the equation. This, however, does not necessarily imply a sequential up-mixing scheme. Instead, for obtaining a fully parallel up-mixing scheme, which is, for example, performed using a certain up-mixing matrix having certain up-mixing matrix elements, the equations for A, C, E, and F are inserted into the equations for B and D. Thus, it becomes clear that reconstructed channel energy is only determined by balance parameters, the down-mix channel(s), and the information on the down-mixing scheme such as the down-mixing factors.

Given the above IID parameters it is evident that the problem of defining a parameter set of IID parameters that can be used for several channel configurations has been solved as will be obvious from the below. As an example, observing the three channel configuration (i.e. recreating three front channels from one available channel), it is evident that the $r_3$, $r_4$ and $r_5$ parameters are obsolete since the A, E and F channels do not exist. It is also evident that the parameters $r_1$ and $r_2$ are sufficient to recreate the three channels from a downmixed single channel since $r_1$ describes the energy ratio between the left and right front channels, and $r_2$ describes the energy ratio between the center channel and the left and right front channels.

In the more general case it is easily seen that the IID parameters ($r_1 \ldots r_5$ as defined above apply to all subsets of recreating n channels from m channels where $m<n\leqq 6$. Observing FIG. 4 it can be said:

For a system recreating 2 channels from 1 channel, sufficient information to retain the correct energy ratio between the channels is obtained from the $r_1$ parameter;

For a system recreating 3 channels from 1 channel, sufficient information to retain the correct energy ratio between the channels is obtained from the $r_1$ and $r_2$ parameters;

For a system recreating 4 channels from 1 channel, sufficient information to retain the correct energy ratio between the channels is obtained from the $r_1$, $r_2$ and $r_3$ parameters;

For a system recreating 5 channels from 1 channel, sufficient information to retain the correct energy ratio between the channels is obtained from the $r_1$, $r_2$, $r_3$ and $r_4$ parameters;

For a system recreating 5.1 channels from 1 channel, sufficient information to retain the correct energy ratio between the channels is obtained from the $r_1$, $r_2$, $r_3$, $r_4$ and $r_5$ parameters;

For a system recreating 5.1 channels from 2 channels, sufficient information to retain the correct energy ratio between the channels is obtained from the $r_2$, $r_3$, $r_4$ and $r_5$ parameters.

Figures 10A, 10B:
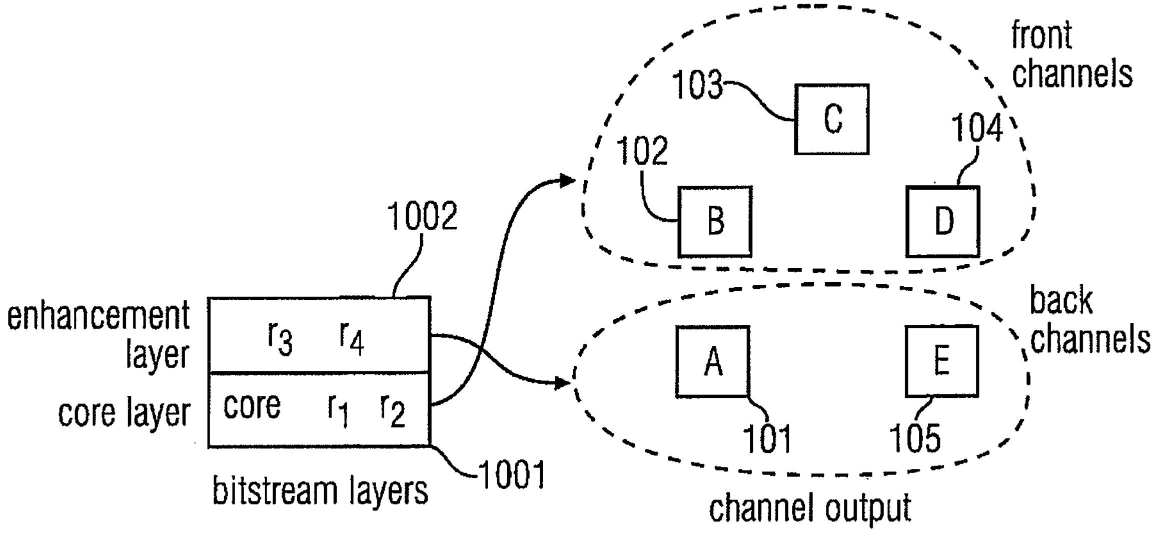
FIG. 10*a* illustrates a scalable bit stream having different parts of the multi-channel parameterization in different layers of the bit stream.
FIG. 10*b* illustrates a scalability table indicating which channels can be constructed using which balance parameters, and which balance parameters and channels are not used or calculated.

The above described scalability feature is illustrated by the table in FIG. 10*b*. The scalable bit stream illustrated in FIG. 10*a* and explained later on can also be adapted to the table in FIG. 10*b* for obtaining a much finer scalability than shown in FIG. 10*a*.

The inventive concept is especially advantageous in that the left and right channels can be easily reconstructed from a single balance parameter $r_1$ without knowledge or extraction of any other balance parameter. To this end, in the equations for B, D in FIG. 8, the channels A, C, F, and E are simply set to zero.

Alternatively, when only the balance parameter $r_2$ is considered, the reconstructed channels are the sum between the center channel and the low frequency channel (when this channel is not set to zero) on the one hand and the sum between the left and right channels on the other hand. Thus, the center channel on the one hand and the mono signal on the other hand can be reconstructed using only a single parameter. This feature can already be useful for a simple 3-channel representation, where the left and right signals are derived from the sum of left and right such as by halving, and where the energy between the center and the sum of left and right is exactly determined by the balance parameter $r_2$.

In this context, the balance parameters $r_1$ or $r_2$ are situated in a lower scaling layer.

As to the second entry in the FIG. 10*b* table, which indicates how 3 channels B, D, and the sum between C and F can be generated using only two balance parameters instead of all 5 balance parameters, one of those parameters $r_1$ and $r_2$ can already be in a higher scaling layer than the parameter $r_1$ or $r_2$, which is situated in the lower scaling layer.

When the equations in FIG. 8 are considered, it becomes clear that, for calculating C, the non-extracted parameter $r_5$ and the other non-extracted parameter $r_3$ are set to 0. Additionally, the non-used channels A, E, F are also set to 0, so that the 3 channels B, D, and the combination between the center channel C and the low frequency enhancement channel F can be calculated.

When a 4-channel representation is to be up-mixed, it is sufficient to only extract parameters $r_1$, $r_2$, and $r_3$ from the parameter data stream. In this context, $r_3$ could be in a next-higher scaling layer than the other parameter $r_1$ or $r_2$. The 4-channel configuration is specially suitable in connection with the super-balance parameter representation of the present invention, since, as it will be described later on in connection with FIG. 6, the third balance parameter $r_3$ already is derived from a combination of the front channels on the one hand and the back channels on the other hand. This is due to the fact that the parameter $r_3$ is a front-back balance parameter, which is derived from the channel pair having, as a first channel, a combination of the back channels A and E, and having, as the front channels, a combination of left channel B, right channel E, and center channel C.

Thus, the combined channel energy of both surround channels is automatically obtained without any further separate calculation and subsequent combination, as would be the case in a single reference channel set-up.

When 5 channels have to be recreated from a single channel, the further balance parameter $r_4$ is necessary. This parameter $r_4$ can again be in a next-higher scaling layer.

When a 5.1 reconstruction has to be performed, each balance parameter is required. Thus, a next-higher scaling layer including the next balance parameter $r_5$ will have to be transmitted to a receiver and evaluated by the receiver.

However, using the same approach of extending the IID parameters in accordance to the extended number of channels, the above IID parameters can be extended to cover channel configuration s with a larger number of channels than the 5.1 configuration. Hence the present invention is not limited to the examples outlined above.

Now observing the case were the channel configuration is a 5.1 channel configuration this being one of the most commonly used cases. Furthermore, assume that the 5.1. channels are recreated from two channels. A different set of parameters can for this case be defined by replacing the parameters $r_3$ and $r_4$ by:

$$q_3 = \frac{\beta^2 A}{\alpha^2 B}$$

$$q_4 = \frac{\beta^2 E}{\alpha^2 D}$$

The parameters $q_3$ and $q_4$ represent the energy ratio between the front and back left channels, and the energy ratio between the front and back right channels. Several other parameterizations can be envisioned.

Figure 5:
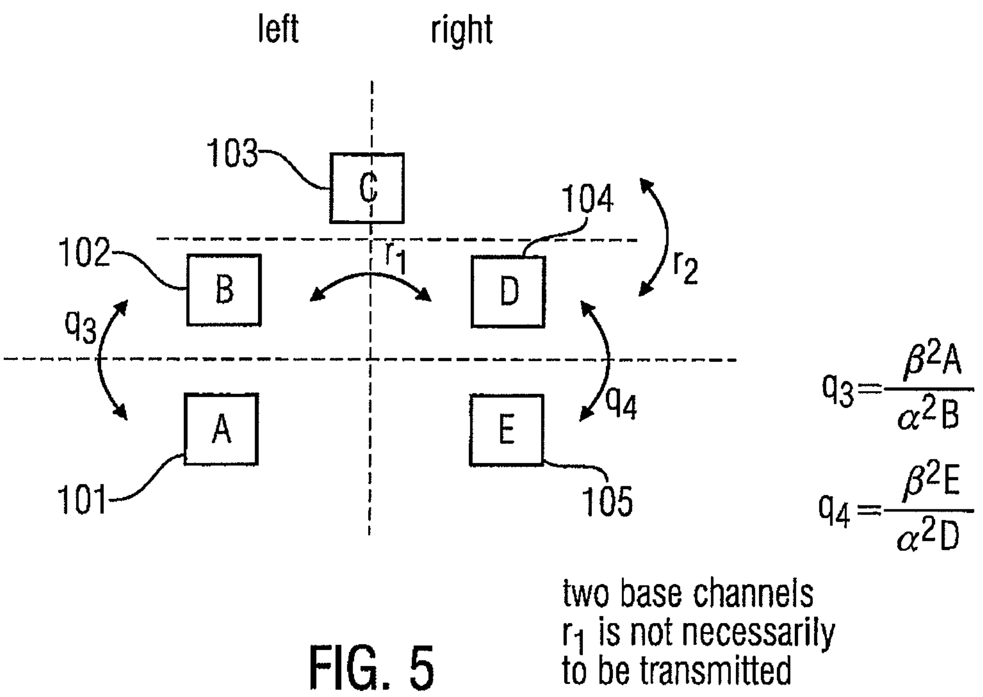
FIG. 5 illustrates one preferred parameterization of the multi-channel signal according to the present invention.

In FIG. 5 the modified parameterization is visualized. Instead of having one parameter outlining the energy distribution between the front and back channels (as was outlined by $r_3$ in FIG. 4) and a parameter describing the energy distribution between the left surround channel and the right surround channel (as was outlined by $r_4$ in FIG. 4) the parameters $q_3$ and $q_4$ are used describing the energy ratio between the left front 102 and left surround 101 channel, and the energy ratio between the right front channel 104 and right surround channel 105.

The present invention teaches that several parameter sets can be used to represent the multi-channel signals. An additional feature of the present invention is that different parameterizations can be chosen dependent on the type of quantization of the parameters that is used.

As an example, a system using coarse quantization of the parameterization, due to high bit rate constraints, a parameterization should be used that does not amplify errors during the upmixing process.

Observing two of the expressions above for the reconstructed energies in a system that re-creates 5.1 channels from one channel:

$$B = \frac{1}{\alpha^2}\left(2\frac{r_1}{1+r_1}M - \beta^2 A - \gamma^2 C - \delta^2 F\right)$$

$$D = \frac{1}{\alpha^2}\left(2\frac{1}{1+r_1}M - \beta^2 E - \gamma^2 C - \delta^2 F\right)$$

It is evident that the subtractions can yield large variations of the B and D energies due to quite small quantization effects of the M, A, C, and F parameters.

According to the present invention a different parameterization should be used that is less sensitive to quantization of the parameters. Hence, if coarse quantization is used, the $r_1$ parameter as defined above:

$$r_1 = \frac{L}{R} = \frac{\alpha^2 B + \beta^2 A + \gamma^2 C + \delta^2 F}{\alpha^2 D + \beta^2 E + \gamma^2 C + \delta^2 F}$$

can be replaced by the alternative definition according to:

$$r_1 = \frac{B}{D}$$

This yields equations for the reconstructed energies according to:

$$B = \frac{1}{\alpha^2}\frac{r_1}{1+r_1}\frac{1}{1+r_2}\frac{1}{1+r_3}\frac{1}{1+r_5}2M$$

$$D = \frac{1}{\alpha^2}\frac{1}{1+r_1}\frac{1}{1+r_2}\frac{1}{1+r_3}\frac{1}{1+r_5}2M$$

and the equations for the reconstructed energies of A, E, C and F stay the same as above. It is evident that this parameterization represents a more well conditioned system from a quantization point of view.

Figure 6:
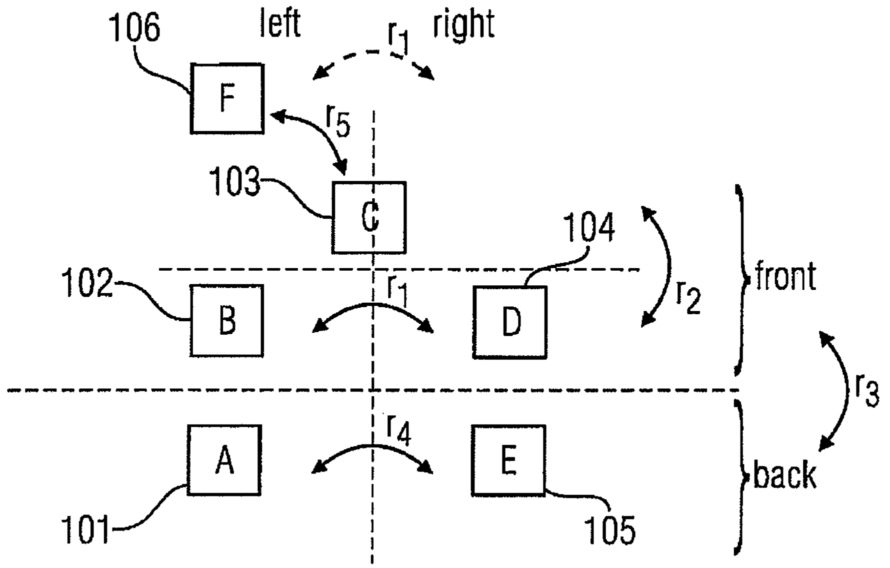
FIG. 6 illustrates one preferred parameterization of the multi-channel signal according to the present invention.

In FIG. 6 the energy ratios as explained above are illustrated. The different output channels are indicated by 101 to 105 and are the same as in FIG. 1 and are hence not elaborated on further here. The speaker set-up is divided into a front part and a back part. The energy distribution between the entire front channel set-up (102, 103 and 104) and the back channels (101 and 105) are illustrated by the arrow in FIG. 6 indicated by the $r_3$ parameter.

Another important noteworthy feature of the present invention is that when observing the parameterization $$r_2 = \frac{\gamma^2 2C}{\alpha^2(B+D)}$$

$$r_1 = \frac{B}{D}$$

it is not only a more well conditioned system from a quantization point of view. The above parameterization also has the advantage that the parameters used to reconstruct the three front channels are derived without any influence of the surround channels. One could envision a parameter $r_2$ that describes the relation between the center channel and all other channels. However, this would have the drawback that the surround channels would be included in the estimation of the parameters describing the front channels.

Remembering that the, in the present invention, described parameterization also can be applied to measurements of correlation or coherence between channels, it is evident that including the back channels in the calculation of $r_2$ can have significant negative influence of the success of re-creating the front channels accurately.

As an example, one could imagine a situation with the same signal in all the front channels, and completely uncorrelated signals in the back channels. This is not uncommon, given that the back channels are frequently used to recreate ambience information of the original sound.

If the center channel is described in relation to all other channels, the correlation measure between the center and the sum of all other channels will be rather low, since the back channels are completely uncorrelated. The same will be true for a parameter estimating the correlation between the front left/right channels, and the back left/right channels.

Hence, we arrive with a parameterization that can reconstruct the energies correctly, but that does not include the information that all front channels were identical, i.e. strongly correlated. It does include the information that the left and right front channels are decorrelated to the back channels, and that the center channel is also decorrelated to the back channels. However, the fact that all front channels are the same is not derivable from such a parameterization.

This is overcome by using the parameterization $$r_2 = \frac{\gamma^2 2C}{\alpha^2(B+D)}$$

$$r_1 = \frac{B}{D}$$

as taught by the present invention, since the back channels are not included in the estimation of the parameters used on the decoder side to re-create the front channels.

The energy distribution between the center channel 103 and the left front 102 and right front 103 channels are indicated by $r_2$ according to the present invention. The energy distribution between the left surround channel 101 and the right surround channel 105 is illustrated by r4. Finally, the energy distribution between the left front channel 102 and the right front channel 104 is given by r1. As is evident all parameters are the same as outlined in FIG. 4 apart from r1 that here corresponds to the energy distribution between the left front speaker and the right front speaker, as opposed to the entire left side and the entire right side. For completeness the parameter r5 is also given outlining the energy distribution between the center channel 103 and the lfe channel 106.

FIG. 6 shows an overview of the preferred parameterization embodiment of the present invention. The first balance parameter $r_1$ (indicated by the solid line) constitutes a front-left/front-right balance parameter. The second balance parameter $r_2$ is a center left-right balance parameter. The third balance parameter $r_3$ constitutes a front/back balance parameter. The forth balance parameter $r_4$ constitutes a rear-left/rear-right balance parameter. Finally, the fifth balance parameter $r_5$ constitutes a center/lfe balance parameter.

FIG. 4 shows a related situation. The first balance parameter $r_1$, which is illustrated in FIG. 4 by solid lines in case of a down-mix-left/right balance can be replaced by an original front-left/front-right balance parameter defined between the channels B and D as the underlying channel pair. This is illustrated by the dashed line $r_1$ in FIG. 4 and corresponds to the solid line $r_1$ in FIG. 5 and FIG. 6.

In a two-base channel situation, the parameters $r_3$ and $r_4$, i.e. the front/back balance parameter and the rear-left/right balance parameter are replaced by two single-sided front/rear parameters. The first single-sided front/rear parameter $q_3$ can also be regarded as the first balance parameter, which is derived from the channel pair consisting of the left surround channel A and the left channel B. The second single-sided front/left balance parameter is the parameter $q_4$, which can be regarded as the second parameter, which is based on the second channel pair consisting of the right channel D and the right surround channel E. Again, both channel pairs are independent from each other. The same is true for the center/left-right balance parameter $r_2$, which have, as a first channel, a center channel C, and as a second channel, the sum of the left and right channels B, and D.

Another parameterization that lends itself well to coarse quantization for a system re-creating 5.1 channels from one or two channel is defined according to the present invention below.

For the one to 5.1 channels:

$$q_1 = \frac{\beta^2 A}{M},\ q_2 = \frac{\alpha^2 B}{M},\ q_3 = \frac{\gamma^2 C}{M},\ q_4 = \frac{\alpha^2 D}{M},\ q_2 = \frac{\beta^2 E}{M}$$

$$\text{and } q_5 = \frac{\delta^2 F}{M}$$

And for the two to 5.1 channels case:

$$q_1 = \frac{\beta^2 A}{L},\ q_2 = \frac{\alpha^2 B}{L},\ q_3 = \frac{\gamma^2 C}{M},\ q_4 = \frac{\alpha^2 D}{R},\ q_2 = \frac{\beta^2 E}{R}$$

$$\text{and } q_5 = \frac{\delta^2 F}{M}$$

It is evident that the above parameterizations include more parameters than is required from the strictly theoretical point of view to correctly re-distribute the energy of the transmitted signals to the re-created signals. However, the parameterization is very insensitive to quantization errors.

The above-referenced parameter set for a two-base channel set-up, makes use of several reference channels. In contrast to the parameter configuration in FIG. 6, however, the parameter set in FIG. 7 solely relies on down-mix channels rather than original channels as reference channels. The balance parameters $q_1$, $q_3$, and $q_4$ are derived from completely different channel pairs.

Figure 2:
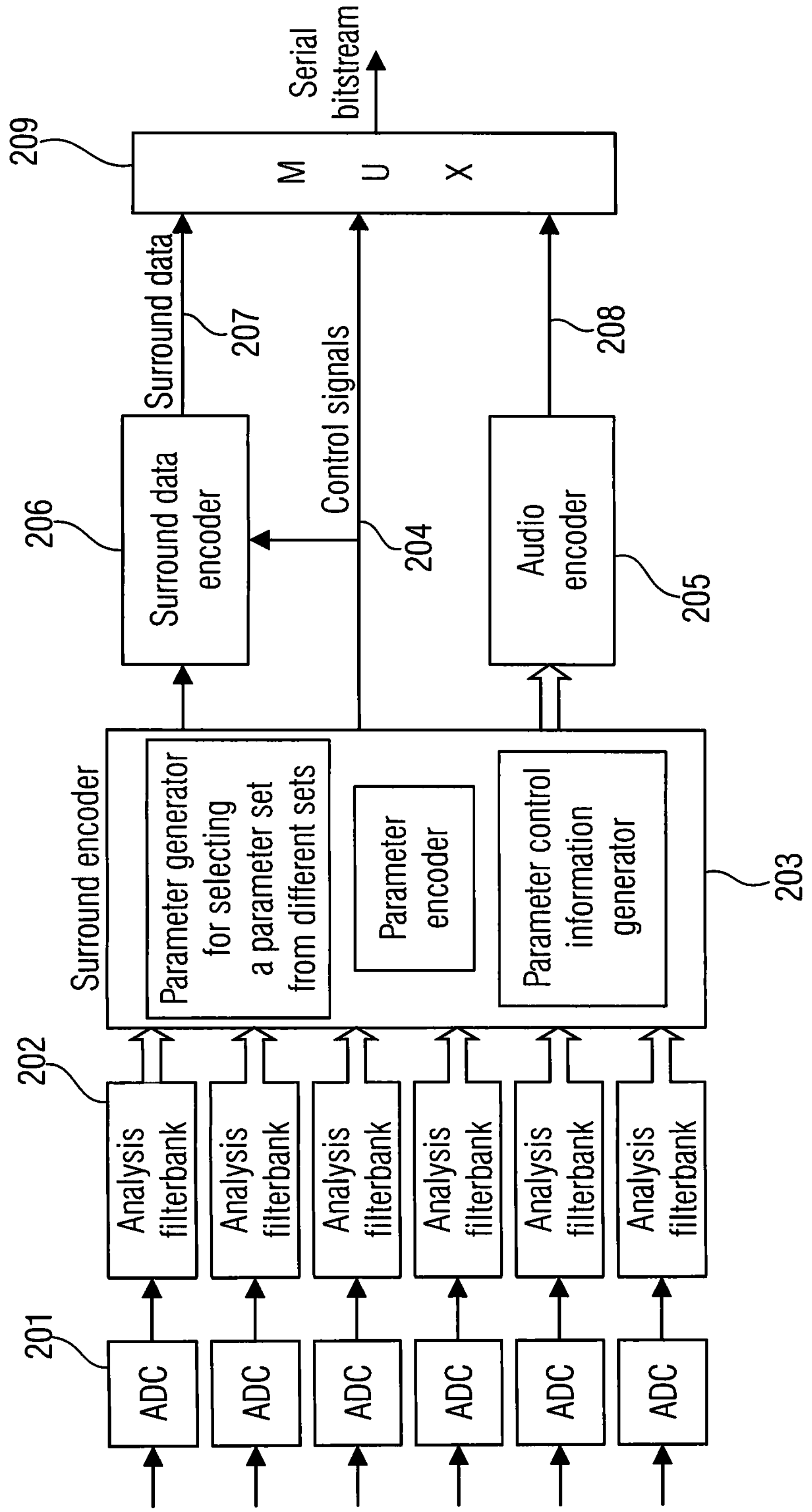
FIG. 2 illustrates a possible encoder implementation of the present invention.

Although several inventive embodiments have been described, in which the channel pairs for deriving balance parameters include only original channels (FIG. 4, FIG. 5, FIG. 6) or include original channels as well as down-mix channels (FIG. 4, FIG. 5) or solely rely on the down-mix channels as the reference channels as indicated at the bottom of FIG. 7, it is preferred that the parameter generator included within the surround data encoder 206 of FIG. 2 is operative to only use original channels or combinations of original channels rather than a base channel or a combination of base channels for the channels in the channel pairs, on which the balance parameters are based. This is due to the fact that one cannot completely guarantee that there does not occur an energy change to the single base channel or the two stereo base channels during their transmission from a surround encoder to a surround decoder. Such energy variations to the down-mix channels or the single down-mix channel can be caused by an audio encoder 205 (FIG. 2) or an audio decoder 302 (FIG. 3) operating under a low-bit rate condition. Such situations can result in manipulation of the energy of the mono down-mix channel or the stereo down-mix channels, which manipulation can be different between the left and right stereo down-mix channels, or can even be frequency-selective and time-selective.

In order to be completely safe against such energy variations, an additional level parameter is transmitted for each block and frequency band for every downmix channel in accordance with the present invention. When the balance parameters are based on the original signal rather than the down-mix signal, a single correction factor is sufficient for each band, since any energy correction will not influence a balance situation between the original channels. Even when no additional level parameter is transmitted, any down-mix channel energy variations will not result in a distorted localization of sound sources in the audio image but will only result in a general loudness variation, which is not as annoying as a migration of a sound source caused by varying balance conditions.

It is important to note that care needs to be taken so that the energy M (of the down-mixed channels), is the sum of the energies B, D, A, E, C and F as outlined above. This is not always the case due to phase dependencies between the different channels being down-mixed in to one channel. The energy correction factor can be transmitted as an additional parameter $r_M$, and the energy of the downmixed signal received on the decoder side is thus defined as:

$$r_M M = \frac{1}{2}(\alpha^2(B+D) + \beta^2(A+E) + 2\gamma^2 C + 2\delta^2 F).$$

In FIG. 9 the application of the additional parameter $r_M$ is outlined. The downmixed input signal is modified by the $r_M$ parameter in 901 prior to sending it into the upmix modules of 701-705. These are the same as in FIG. 7 and will therefore not be elaborated on further. It is obvious for those skilled in the art that the parameter rM for the single channel downmix example above, can be extended to be one parameter per downmix channel, and is hence not limited to a single downmix channel.

Figure 9A:
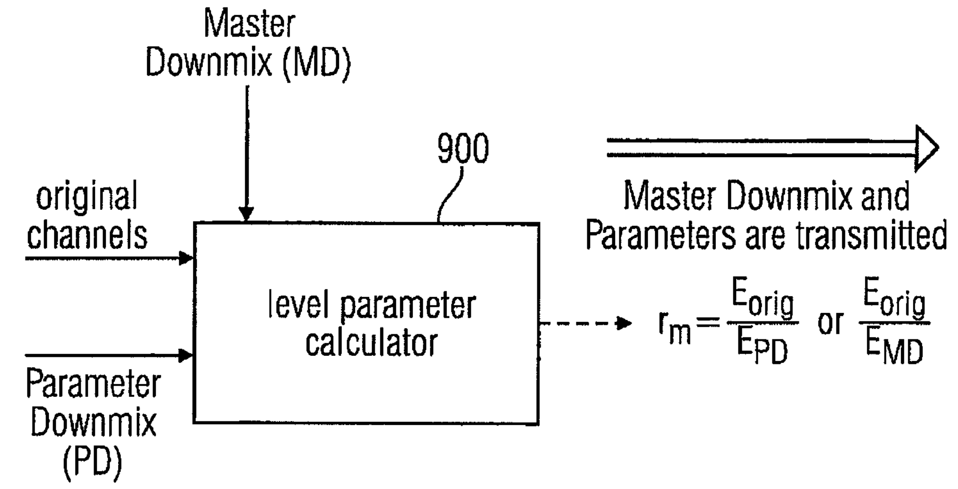
FIG. 9*a* illustrates a determination of a level parameter on an encoder-side.
Figure 9B:
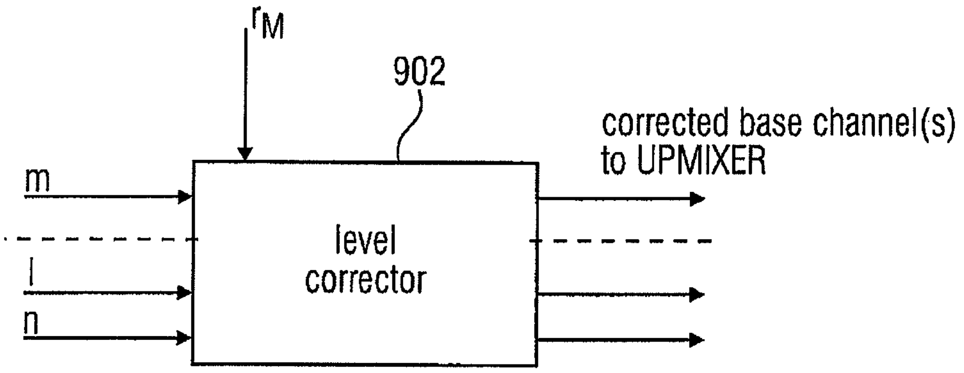
FIG. 9*b* illustrates the usage of the level parameter on the decoder-side.

FIG. 9*a* illustrates an inventive level parameter calculator 900, while FIG. 9*b* indicates an inventive level corrector 902. FIG. 9*a* indicates the situation on the encoderside, and FIG. 9*b* illustrates the corresponding situation on the decoder-side. The level parameter or "additional" parameter $r_M$ is a correction factor giving a certain energy ratio. To explain this, the following exemplary scenario is assumed. For a certain original multi-channel signal, there exists a "master down-mix" on the one hand and a "parameter down-mix" on the other hand. The master down-mix has been generated by a sound engineer in a sound studio based on, for example, subjective quality impressions. Additionally, a certain audio storage medium also includes the parameter down-mix, which has been performed by for example the surround encoder 203 of FIG. 2. The parameter down-mix includes one base channel or two base channels, which base channels form the basis for the multi-channel reconstruction using the set of balance parameters or any other parametric representation of the original multi-channel signal.

There can be the case, for example, that a broadcaster wishes to not transmit the parameter down-mix but the master down-mix from a transmitter to a receiver. Additionally, for upgrading the master down-mix to multi-channel representation, the broadcaster also transmits a parametric representation of the original multi-channel signal. Since the energy (in one band and in one block) can (and typically will) vary between the master down-mix and the parameter down-mix, a relative level parameter $r_M$ is generated in block 900 and transmitted to the receiver as an additional parameter. The level parameter is derived from the master down-mix and the parameter down-mix and is preferably, a ratio between the energies within one block and one band of the master down-mix and the parameter down-mix.

Generally, the level parameter is calculated as the ratio of the sum of the energies ($E_{orig}$) of the original channels and the energy of the downmix channel(s), wherein this downmix channel(s) can be the parameter downmix ($E_{PD}$) or the master downmix ($E_{MD}$) or any other downmix signal. Typically, the energy of the specific downmix signal is used, which is transmitted from an encoder to a decoder.

FIG. 9*b* illustrates a decoder-side implementation of the level parameter usage. The level parameter as well as the down-mix signal are input into the level corrector block 902. The level corrector corrects the single-base channel or the several-base channels depending on the level parameter. Since the additional parameter $r_M$ is a relative value, this relative value is multiplied by the energy of the corresponding base channel.

Although FIGS. 9*a* and 9*b* indicate a situation, in which the level correction is applied to the down-mix channel or the down-mix channels, the level parameter can also be integrated into the up-mixing matrix. To this end, each occurrence of M in the equations in FIG. 8 is replaced by the term "$r_M$M".

Studying the case when re-creating 5.1 channels from 2 channels, the following observation is made.

If the present invention is used with an underlying audio codec as outlined in FIG. 2 and FIGS. 3 205 and 302. some more consideration needs to be made. Observing the IID parameters as defined earlier where r1 was defined according to $$r_1 = \frac{L}{R} = \frac{\alpha^2 B + \beta^2 A + \gamma^2 C + \delta^2 F}{\alpha^2 D + \beta^2 E + \gamma^2 C + \delta^2 F}$$

this parameter is implicitly available on the decoder side since the system is re-creating 5.1 channels from 2 channels, provided that the two transmitted channels is the stereo downmix of the surround channels.

However, the audio codec operating under a bit rate constraint may modify the spectral distribution so that the L and R energies as measured on the decoder differ from their values on the encoder side. According to the present invention such influence on the energy distribution of the recreated channels vanishes by transmitting the parameter $$r_1 = \frac{B}{D}$$

also for the case when reconstruction 5.1 channels from two channels.

If signaling means are provided the encoder can code the present signal segment using different parameter sets and choose the set of IID parameters that give the lowest overhead for the particular signal segment being processed. It is possible that the energy levels between the right front and back channels are similar, and that the energy levels between the front and back left channel are similar but significantly different to the levels in the right front and back channel. Given delta coding of parameters and subsequent entropy coding it can be more efficient to use parameters $q_3$ and $q_4$ instead of $r_3$ and $r_4$. For another signal segment with different characteristics a different parameter set may give a lower bit rate overhead. The present invention allows to freely switching between different parameter representations in order to minimize the bit rate overhead for the presently encoded signal segment given the characteristics of the signal segment. The ability to switch between different parameterizations of the IID parameters in order to obtain the lowest possible bit rate overhead, and provide signaling means to indicate what parameterization is presently used, is an essential feature of the present invention.

Furthermore, the delta coding of the parameters can be done in either the frequency direction or in the time direction, as well as delta coding between different parameters. According to the present invention, a parameter can be delta coded with respect to any other parameter, given that signaling means are provided indicating the particular delta coding used.

An interesting feature for any coding scheme is the ability to do scalable coding. This means that the coded bitstream can be divided into several different layers. The core layer is decodable by itself, and the higher layers can be decoded to enhance the decoded core layer signal. For different circumstances the number of available layers may vary, but as long as the core layer is available the decoder can produce output samples. The parameterization for the multi-channel coding as outlined above using the $r_1$ to $r_5$ parameters lend them selves very well to scalable coding. Hence, it is possible to store the data for e.g. the two surround channels (A and E) in an enhancement layer, i.e. the parameters $r_3$ and $r_4$, and the parameters corresponding to the front channels in a core layer, represented by parameters $r_1$ and $r_2$.

In FIG. 10 a scalable bitstream implementation according to the present invention is outlined. The bitstream layers are illustrated by 1001 and 1002, where 1001 is the core layer holding the wave-form coded downmix signals and the parameters r1 and r2 required to re-create the front channels (102, 103 and 104). The enhancement layer illustrated by 1002 holds the parameters for re-creating the back channels (101 and 105).

Another important aspect of the present invention is the usage of decorrelators in a multi-channel configuration. The concept of using a decorrelator was elaborated on for the one to two channel case in the PCT/SE02/01372 document. However when extending this theory to more than two channels several problems arise that the present invention solves.

Elementary mathematics show that in order to achieve M mutually decorrelated signals from N signals, M−N decorrelators are required, where all the different decorrelators are functions that create mutually orthogonal output signals from a common input signal. A decorrelator is typically an allpass or near allpass filter that given an input x(t) produces an output y(t) with $E[|y|^2]=E[|x|^2]$ and almost vanishing cross-correlation E[yx*]. Further perceptual criteria come in to the design of a good decorrelator, some examples of design methods can be to also minimize the comb-filter character when adding the original signal to the decorrelated signal and to minimize the effect of a sometimes too long impulse response at transient signals. Some prior art decorrelators utilizes an artificial reverberator to decorrelate. Prior art also includes fractional delays by e.g. modifying the phase of the complex subband samples, to achieve higher echo density and hence more time diffusion.

The present invention suggests methods of modifying a reverberation based decorrelator in order to achieve multiple decorrelators creating mutually decorrelated output signals from a common input signal. Two decorrelators are mutually decorrelated if their outputs $y_1(t)$ and $y_2(t)$ have vanishing or almost vanishing cross-correlation given the same input. Assuming the input is stationary white noise it follows that the impulse responses $h_1$ and $h_2$ must be orthogonal in the sense that $E[h_1h_2^*]$ is vanishing or almost vanishing. Sets of pair wise mutually decorrelated decorrelators can be constructed in several ways. An efficient way of doing such modifications is to alter the phase rotation factor q that is part of the fractional delay.

The present invention stipulates that the phase rotation factors, can be part of the delay lines in the all-pass filters or just an overall fractional delay. In the latter case this method is not limited to all-pass or reverberation like filters, but can also be applied to e.g. simple delays including a fractional delay part. An all-pass filter link in the decorrelator can be described in the Z-domain as:

$$H(z) = \frac{qz^{-m} - a}{1 - aqz^{-m}},$$

where q is the complex valued phase rotation factor (|q|=1), m is the delay line length in samples and a is the filter coefficient. For stability reasons, the magnitude of the filter coefficient has to be limited to |a|<1. However, by using the alternative filter coefficient a'=−a, a new reverberator is defined having the same reverberation decay properties but with an output significantly uncorrelated with the output from the non-modified reverberator. Furthermore, a modification of the phase rotation factor q, can be done by e.g. adding a constant phase offset, $q'=qe^{jC}$. The constant C, can be used as a constant phase offset or could be scaled in a way that it would correspond to a constant time offset for all frequency bands it is applied on. The phase offset constant C, can also be a random value that is different for all frequency bands.

According to the present invention, the generation of n channels from m channels is performed by applying an upmix matrix H of size n×(m+p) to a column vector of size (m+p)×1 of signals $$y = \begin{bmatrix} m \\ s \end{bmatrix}$$

wherein m are the m downmixed and coded signals, and the p signals in s are both mutually decorrelated and decorrelated from all signals in m. These decorrelated signals are produced from the signals in m by decorrelators. The n reconstructed signals a',b', . . . are then contained in the column vector $$x' = Hy$$

Figure 11:
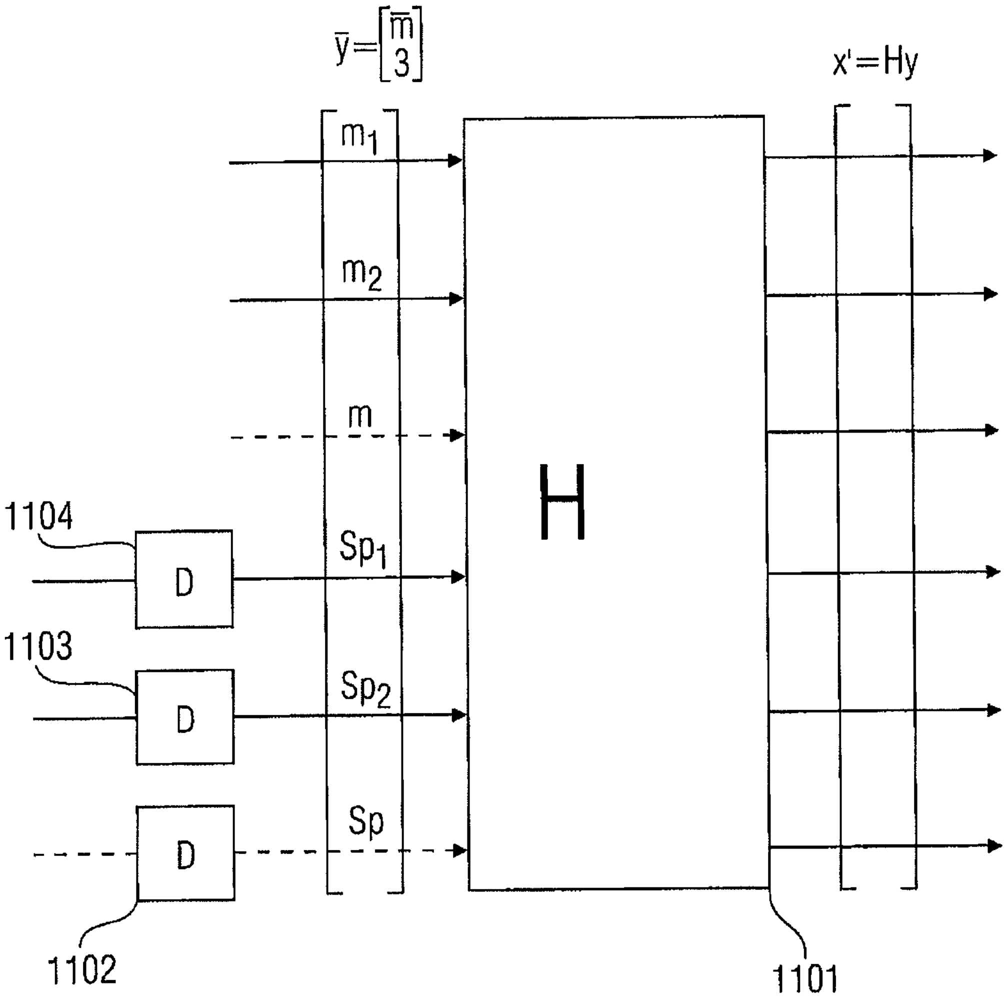
FIG. 11 illustrates the application of the up-mix matrix according to the present invention.

The above is illustrated by FIG. 11, where the decorrelated signals are created by the decorrelators 1102, 1103 and 1104. The upmix matrix H is given by 1101 operating on the vector y giving the output signal x'.

Let R=E[xx*] be the correlation matrix of the original signal vector let R'=E[x'x'*] be the correlation matrix of the reconstructed signal. Here and in the following, for a matrix or a vector X with complex entries, X* denotes the adjoint matrix, the complex conjugate transpose of X. The diagonal of R contains the energy values A, B, C, . . . and can be decoded up to a total energy level from the energy quotas defined above. Since R*=R, there are only n(n−1)/2 different off diagonal cross-correlation values containing information that is to be reconstructed fully or partly by adjusting the upmix matrix H. A reconstruction of the full correlation structure corresponds to the case R'=R. Reconstruction of correct energy levels only correspond to the case where R' and R are equal on their diagonals.

In the case of n channels from m=1 channel, a reconstruction of the full correlation structure is achieved by using p=n−1 mutually decorrelated decorrelators an upmix matrix H which satisfies the condition $$HH^* = \frac{1}{M}R$$

where M is the energy of the single transmitted signal. Since R is positive semidefinite it is well known that such a solution exists. Moreover, n(n−1)/2 degrees of freedom are left over for the design of H, which are used in the present invention to obtain further desirable properties of the upmix matrix. A central design criterion is that the dependence of H on the transmitted correlation data shall be smooth.

One convenient way of parametrizing the upmix matrix is H=UDV where U and V are orthogonal matrices and D is a diagonal matrix. The squares of the absolute values of D can be chosen equal to the eigenvalues of R/M. Omitting V and sorting the eigenvalues so that the largest value is applied to the first coordinate will minimize the overall energy of decorrelated signals in the output. The orthogonal matrix U is in the real case parameterized by n(n−1)/2 rotation angles. Transmitting correlation data in the form of those angles and the n diagonal values of D would immediately give the desired smooth dependence of H. However since energy data has to be transformed into eigenvalues, scalability is sacrificed by this approach.

A second method taught by the present invention, consists of separating the energy part from the correlation part in R by defining a normalized correlation matrix $R_0$ by $R=GR_0G$ where G is a diagonal matrix with the diagonal values equal to the square roots of the diagonal entries of R, that is, $\sqrt{A}$, $\sqrt{B}$ . . . , and $R_0$ has ones on the diagonal. Let $H_0$ be is an orthogonal upmix matrix defining the preferred normalized upmix in the case of totally uncorrelated signals of equal energy. Examples of such preferred upmix matrices are $$\frac{1}{\sqrt{2}}\begin{bmatrix} 1 & -1 \\ 1 & 1 \end{bmatrix},$$

$$\frac{1}{2}\begin{bmatrix} 1 & 1 & \sqrt{2} \\ 1 & 1 & -\sqrt{2} \\ \sqrt{2} & -\sqrt{2} & 0 \end{bmatrix},$$

$$\frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix}.$$

The upmix is then defined by $H=GSH_0/\sqrt{M}$, where the matrix S solves $SS^*=R_0$. The dependence of this solution on the normalized cross-correlation values in $R_0$ is chosen to be continuous and such that S is equal to the identity matrix I in the case $R_0=I$.

Dividing the n channels into groups of fewer channels is a convenient way to reconstruct partial cross-correlation structure. According to the present invention, a particular advantageous grouping for the case of 5.1 channels from 1 channel is {a,e},{c},{b,d},{f}, where no decorrelation is applied for the groups {c},{f}, and the groups {a,e},{b,d} are produced by upmix of the same downmixed/decorrelated pair. For these two subsystems, the preferred normalized upmixes in the totally uncorrelated case are to be chosen as $$\frac{1}{\sqrt{2}}\begin{bmatrix} 1 & -1 \\ 1 & 1 \end{bmatrix},$$

$$\frac{1}{\sqrt{2}}\begin{bmatrix} 1 & 1 \\ 1 & -1 \end{bmatrix},$$

respectively. Thus only two of the totality of 15 cross-correlations will be transmitted and reconstructed, namely those between channels {a,e} and {b,d}. In the terminology used above, this is an example of a design for the case n=6, m=1, and p=1. The upmix matrix H is of size 6×2 with zeros at the two entries in the second column at rows 3 and 6 corresponding to outputs c' and f'.

A third approach taught by the present invention for incorporating decorrelated signals is the simpler point of view that each output channel has a different decorrelator giving rise to decorrelated signals $s_a s_b$, . . . . The reconstructed signals are then formed as $$a'=\sqrt{A/M}(m\cos\phi_a+s_a\sin\phi_a),$$

$$b'=\sqrt{B/M}(m\cos\phi_b+s_b\sin\phi_b),$$

etc. . . .

The parameters $\phi_a,\phi_b$, . . . control the amount of decorrelated signal present in output channels a',b', . . . . The correlation data is transmitted in form of these angles. It is easy to compute that the resulting normalized cross-correlation between, for instance, channel a' and b' is equal to the product $\cos\phi_a \cos\phi_b$. As the number of pairwise cross-correlations is n(n−1)/2 and there are n decorrelators it will not be possible in general with this approach to match a given correlation structure if n>3, but the advantages are a very simple and stable decoding method, and the direct control on the produced amount of decorrelated signal present in each output channel. This enables for the mixing of decorrelated signals to be based on perceptual criteria incorporating for instance energy level differences of pairs of channels.

For the case of n channels from m>1 channels, the correlation matrix $R_y=E[yy^*]$ can no longer be assumed diagonal, and this has to be taken into account in the matching of $R'=HR_yH^*$ to the target R. A simplification occurs, since $R_y$ has the block matrix structure $$R_y = \begin{bmatrix} R_m & 0 \\ 0 & R_s \end{bmatrix},$$

where $R_m=E[mm^*]$ and $R_s=E[ss^*]$. Furthermore, assuming mutually decorrelated decorrelators, the matrix $R_s$ is diagonal. Note that this also affects the upmix design with respect to the reconstruction of correct energies. The solution is to compute in the decoder, or to transmit from the encoder, information about the correlation structure $R_m$ of the downmixed signals.

For the case of 5.1 channels from 2 channels a preferred method for upmix is $$\begin{bmatrix} a' \\ b' \\ c' \\ d' \\ e' \\ f' \end{bmatrix} = \begin{bmatrix} h_{11} & 0 & h_{13} & 0 \\ h_{21} & 0 & h_{23} & 0 \\ h_{31} & h_{32} & 0 & 0 \\ 0 & h_{42} & 0 & h_{44} \\ 0 & h_{52} & 0 & h_{54} \\ h_{61} & h_{62} & 0 & 0 \end{bmatrix} \cdot \begin{bmatrix} m_1 \\ m_2 \\ s_1 \\ s_2 \end{bmatrix},$$

where $s_1$ is obtained from decorrelation of $m_1=l_d$ and $s_2$ is obtained from decorrelation of $m_2=r_d$.

Here the groups {a,b} and {d,e} are treated as separate 1→2 channels systems taking into account the pairwise cross-correlations. For channels c and f, the weights are to be adjusted such that $$E[|h_{31}m_1+h_{32}m_2|^2]=C,$$

$$E[|h_{61}m_1+h_{62}m_2|^2]=F,$$

Figure 3:
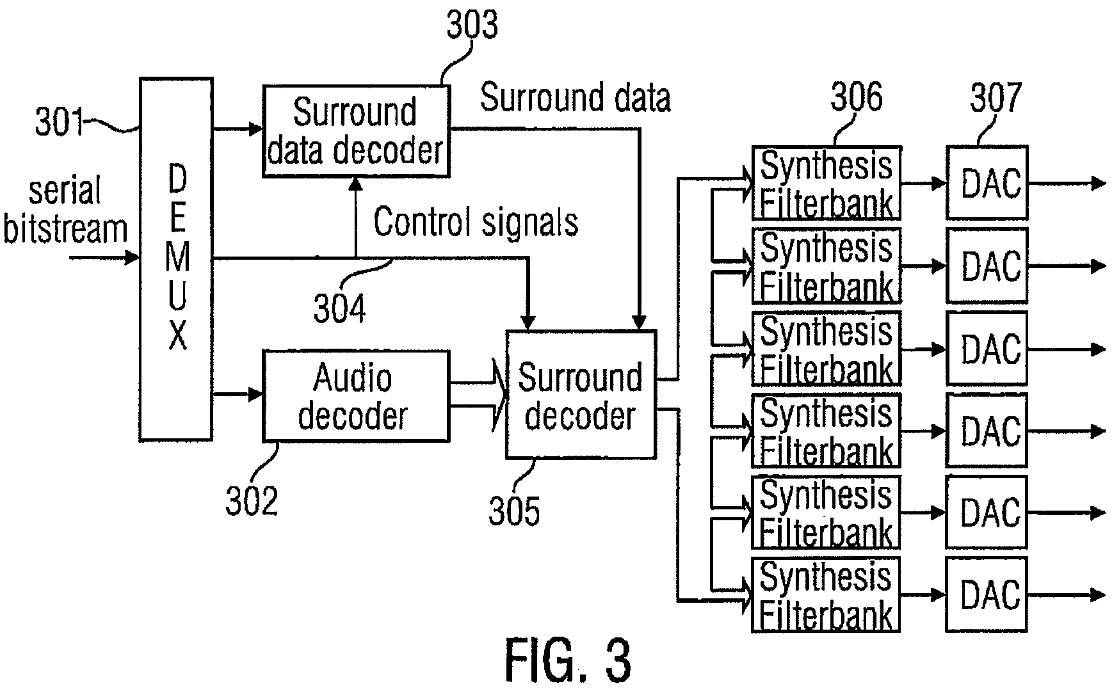
FIG. 3 illustrates a possible decoder implementation of the present invention.

The present invention can be implemented in both hardware chips and DSPs, for various kinds of systems, for storage or transmission of signals, analogue or digital, using arbitrary codecs. FIG. 2 and FIG. 3 show a possible implementation of the present invention. In this example a system operating on six input signals (a 5.1 channel configuration) is displayed. In FIG. 2 the encoder side is displayed the analogue input signals for the separate channels are converted to a digital signal 201 and analyzed using a filterbank for every channel 202. The output from the filterbanks is fed to the surround encoder 203 including a parameter generator that performs a downmix creating the one or two channels encoded by the audio encoder 205. Furthermore, the surround parameters such as the IID and ICC parameters are extracted according to the present invention, and control data outlining the time frequency grid of the data as well as which parameterization is used is extracted 204 according to the present invention. The extracted parameters are encoded 206 as taught by the present invention, either switching between different parameterizations or arranging the parameters in a scalable fashion. The, surround parameters 207, control signals and the encoded down mixed signals 208 are multiplexed 209 into a serial bitstream.

In FIG. 3 a typical decoder implementation, i.e. an apparatus for generating multi-channel reconstruction is displayed. Here it is assumed that the Audio decoder outputs a signal in a frequency domain representation, e.g. the output from the MPEG-4 High efficiency AAC decoder prior to the QMF synthesis filterbank. The serial bitstream is demultiplexed 301 and the encoded surround data is fed to the surround data decoder 303 and the down mixed encoded channels are fed to the audio decoder 302, in this example an MPEG-4 High Efficiency AAC decoder. The surround data decoder decodes the surround data and feeds it to the surround decoder 305, which includes an upmixer, that recreates six channels based on the decoded down-mixed channels and the surround data and the control signals. The frequency domain output from the surround decoder is synthesized 306 to time domain signals that are subsequently converted to analogue signals by the DAC 307.

Although the present invention has mainly been described with reference to the generation and usage of balance parameters, it is to be emphasized here that preferably the same grouping of channel pairs for deriving balance parameters is also used for calculating inter-channel coherence parameters or “width” parameters between these two channel pairs. Additionally, inter-channel time differences or a kind of “phase cues” can also be derived using the same channel pairs as used for the balance parameter calculation. On the receiver-side, these parameters can be used in addition or as an alternative to the balance parameters to generate a multi-channel reconstruction. Alternatively, the inter-channel coherence parameters or even the inter-channel time differences can also be used in addition to other inter-channel level differences determined by other reference channels. In view of the scalability feature of the present invention as discussed in connection with FIG. 10*a* and FIG. 10*b*, it is, however, preferred to use the same channel pairs for all parameters so that, in a scalable bit stream, each scaling layer includes all parameters for reconstructing the sub-group of output channels, which can be generated by the respective scaling layer as outlined in the penultimate column of the FIG. 10*b* table. The present invention is useful, when only the coherence parameters or the time difference parameters between the respective channel pairs are calculated and transmitted to a decoder. In this case, the level parameters already exist at the decoder for usage when a multichannel reconstruction is performed.

Depending on certain implementation requirements of the inventive methods, the inventive methods can be implemented in hardware or in software. The implementation can be performed using a digital storage medium, in particular a disk or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. Apparatus for generating a parameter representation of a multi-channel input signal having at least three original channels, comprising:

a parameter generator for generating a first balance parameter, a first coherence parameter or a first time difference parameter between a first channel pair, and for generating a second balance parameter, a second coherence parameter or a second time parameter between a second channel pair, the balance parameters, coherence parameters or time parameters forming the parameter representation, wherein the first channel pair has two channels, which are different from two channels of the second channel pair, and wherein each channel of the two channel pair is one of the original channels, a weighted or unweighted combination of the original channels, a downmix channel, or a weighted or unweighted combination of at least two downmix channels, and wherein the first channel pair and the second channel pair include information on the three original channels, wherein the parameter generator is operative to generate different sets of parameters, each set including at least two parameters, wherein channel pairs used for calculating the parameters in the different sets are different from each other, wherein the parameter generator is further operative to select one set of the different sets for output for a presently encoded signal segment, which results in a lower bit rate given a certain parameter-coding scheme, wherein the apparatus further comprises:
a parameter encoder for encoding the selected set using a certain parameter coding scheme; and
a parameter control information generator for generating control information indicating a characteristic of the selected parameter scheme, and
wherein the control information signalling the selected parameter scheme is included into an output bitstream.

2. Apparatus in accordance with claim 1, in which the original channels include a left channel, a right channel and a center channel, and
in which the second balance parameter is a center balance parameter and the second channel pair includes, as a first channel, the center channel and, as a second channel, a channel combination including the left channel and the right channel.

3. Apparatus in accordance with claim 2, in which the parameter generator is operative to calculate the center balance parameter in accordance with the following equation:

$$r_2 = \frac{\gamma^2 2C}{\alpha^2(B+D)}$$

wherein $r_2$ is the center balance parameter, wherein C represents the centre channel, wherein B represents a left-channel, wherein D represents a right channel, and wherein $\gamma$ and $\alpha$ represent down-mixing factors.

4. Apparatus in accordance with claim 1, in which the original channels include a rear-left channel and a rear-right channel,
in which the parameter generator is operative to generate, as a third balance parameter or as one of the first and second balance parameters a front/back parameter between a front/back channel pair having, as a first channel, a channel combination including the rear-left channel and the rear-right channel and, as a second channel, a channel combination including a left channel and a right channel.

5. Apparatus in accordance with claim 4, in which the parameter generator is operative to calculate the front/back parameter based on the following equation:

$$r_3 = \frac{\beta^2(A+E)}{\alpha^2(B+D)+\gamma^2 2C}$$

wherein $r_3$ is the front/back balance parameter, wherein A is a rear-left channel, wherein E is a rear-right channel, wherein B represents a left-channel, wherein D represents a right channel, wherein C represents a center channel, and wherein $\alpha$, $\beta$, and $\gamma$ represent down-mixing parameters.

6. Apparatus in accordance with claim 1, in which the original multi-channel signal includes a low-frequency enhancement channel and a center channel,
in which the parameter generator is operative to generate, as an additional balance parameter or as the first or the second balance parameters a low-frequency enhancement balance parameter between a low-frequency enhancement channel pair having, as a first channel, the low-frequency enhancement channel, and as a second channel, the center channel or a channel combination including the center channel and a left and a right channel of the original channels.

7. Apparatus in accordance with claim 6, in which the parameter generator is operative to calculate the low-frequency enhancement balance parameter, in accordance with the following equation:

$$r_5 = \frac{\delta^2 2F}{\alpha^2(B+D)+\beta^2(A+E)+\gamma^2 2C}$$

wherein A corresponds to a rear-left channel, wherein E corresponds to a rear-right channel, wherein B corresponds to a left channel, wherein D corresponds to a right channel, wherein C corresponds to a center channel, wherein F corresponds to the low-frequency enhancement channel, wherein $\alpha$, $\beta$, $\gamma$ and $\delta$ are down-mixing factors, and wherein $r_5$ is the low-frequency enhancement balance parameter.

8. Apparatus in accordance with claim 1, wherein the parameter encoder comprises a quantizer.

9. Apparatus in accordance with claim 1, in which the parameter generator is operative to only use original channels or combinations of original channels rather than a base channel or a combination of base channels as channels within the channel pairs.

10. Apparatus in accordance with claim 1, wherein the parameter encoder is configured for performing delta coding of the selected set and subsequent entropy coding.

11. Apparatus in accordance with claim 10, in which the delta coding is done in either a frequency direction or a time direction or between different parameters, and
wherein the apparatus is configured to provide signaling means indicating a particular delta coding used.

12. Apparatus for generating a reconstructed multi-channel representation of an original multi-channel signal having at least three original channels, the apparatus using a number of base channels generated by converting the original multi-channel signal using a down-mix scheme, the apparatus furthermore using a first balance parameter, a first coherence parameter or a first time difference parameter between a first channel pair, and for generating a second balance parameter, a second coherence parameter or a second time parameter between a second channel pair, the balance parameters, coherence parameters or time parameters forming a parameter representation, wherein the first channel pair has two channels, which are different from two channels of the second channel pair, and wherein each channel of the two channel pair is one of the original channels, a weighted or unweighted combination of the original channels, a downmix channel, or a weighted or unweighted combination of at least two downmix channels, and wherein the first channel pair and the second channel pair include information on the three original channels, and the apparatus furthermore using control information signalling a selected parameter scheme, the apparatus comprising:
an up-mixer for generating a number of up-mix channels, the number of up-mix channels being greater than the number of base channels and smaller than or equal to a number of original channels,
wherein the up-mixer is operative to generate reconstructed channels based on information on the down-mixing scheme and using the balance parameters, the coherence parameters, or the inter-channel time differences such that a balance or coherence or inter-channel time difference between a first channel pair is determined based on the first balance parameter, the first inter-channel coherence parameter, or the first interchannel time difference, and a balance, an inter-channel coherence, or an inter-channel level difference between a second channel pair is determined based on the second balance parameter, the second inter-channel coherence parameter, or the second inter-channel time difference parameter, wherein the apparatus further comprises a parameter scheme selector for controlling the up-mixer such that the up-mixer applies a parameter scheme indicated by a parameter scheme control information.

13. Apparatus in accordance with claim 12, in which the original channels include a left channel, a right channel and a centre channel, and in which the second balance parameter is a centre balance parameter and the second channel pair includes, as a first channel, the centre channel and, as a second channel, a channel combination including the left channel and the right channel, in which the up-mixer is operative to generate a reconstructed center channel based on the second balance parameter.

14. Apparatus in accordance with one of claim 12, in which the original channels include a rear-left channel and a rear-right channel, in which the parameter representation includes, as a third balance parameter or as one of the first and second balance parameters a front/back parameter between a front/back channel pair having, as a first channel, a channel combination including the rear-left channel and the rear-right channel and, as a second channel, a channel combination including a left channel and a right channel, and in which the up-mixer is operative to generate a reconstructed combined rear channel using the front/back balance parameter.

15. Apparatus in accordance with one of claim 12, in which a parameter information provided to the apparatus includes, as the first balance parameter, a left/right balance parameter, as the second balance parameter, a centre balance parameter, as a third balance parameter, a front/back balance parameter, as a forth balance parameter, a rear-left/right balance parameter, and as a fifth balance parameter, a low-frequency enhancement balance parameter, and in which a data stream includes the first and second balance parameters in a lower scaling layer and the third and fourth balance parameters or corresponding coherence parameters or corresponding time differences in one or more higher scaling layers, and in which the up-mixer is operative to use the first balance parameter and the second balance parameter for generating a left output channel, a right output channel, and an output channel including the center channel, or in which the up-mixer is operative to additionally use the front/back balance parameter for additionally reconstructing a sum between the rear-left channel and the rear-right channel; or in which the up-mixer is operative to use, in addition, the rear left/right balance parameter for reconstructing a rear left channel and a rear right channel.

16. Apparatus in accordance with claim 15, in which the up-mixer is operative to generate the reconstructed multi-channel signal such that the following equations are fulfilled:

$$F=\frac{1}{2\gamma^2}\frac{r_5}{1+r_5}2M$$

-continued $$A=\frac{1}{\beta^2}\frac{r_4}{1+r_4}\frac{r_3}{1+r_3}\frac{1}{1+r_5}2M$$

$$E=\frac{1}{\beta^2}\frac{1}{1+r_4}\frac{r_3}{1+r_3}\frac{1}{1+r_5}2M$$

$$C=\frac{1}{2\gamma^2}\frac{r_2}{1+r_2}\frac{1}{1+r_3}\frac{1}{1+r_5}2M$$

$$B=\frac{1}{\alpha^2}\left(2\frac{r_1}{1+r_1}M-\beta^2A-\gamma^2C-\delta^2F\right)$$

$$D=\frac{1}{\alpha^2}\left(2\frac{1}{1+r_1}M-\beta^2E-\gamma^2C-\delta^2F\right)$$

wherein F corresponds to a low-frequency enhancement channel, wherein A corresponds to a left surround channel, wherein E corresponds to a right surround channel, wherein C corresponds to a center channel, wherein B corresponds to a left channel, wherein D corresponds to a right channel, wherein $r_1$ is a left/right balance parameter, wherein $r_2$ is a center/left-right balance parameter, wherein $r_3$ is a front/right balance parameter, wherein $r_4$ is a rear left/right balance parameter, wherein $r_5$ is a center/low frequency enhancement balance parameter, and wherein $\alpha$, $\beta$, $\gamma$, and $\delta$) are down-mixing factors.

17. Method of generating a parameter representation of a multi-channel input signal having at least three original channels, comprising:

generating a first balance parameter, a first coherence parameter or a first time difference parameter between a first channel pair, and generating a second balance parameter, a second coherence parameter or a second time parameter between a second channel pair, the balance parameters, coherence parameters or time parameters forming the parameter representation, wherein the first channel pair has two channels, which are different from two channels of the second channel pair, and wherein each channel of the two channel pair is one of the original channels, a weighted or unweighted combination of the original channels, a downmix channel, or a weighted or unweighted combination of at least two downmix channels, and wherein the first channel pair and the second channel pair include information on the three original channels, wherein different sets of parameters are generated, each set including at least two parameters, wherein channel pairs used for calculating the parameters in the different sets are different from each other, wherein one set of the different sets is selected for output for a presently encoded signal segment, which results in a lower bit rate given a certain parameter-coding scheme, wherein the method further comprises:

encoding the selected set using a certain parameter coding scheme; and generating control information indicating a characteristic of the selected parameter scheme, and wherein the control information signalling the selected parameter scheme is included into an output bitstream.

18. Method of generating a reconstructed multi-channel representation of an original multi-channel signal having at least three original channels, the method using a number of base channels generated by converting the original multi-channel signal using a down-mix scheme, the method furthermore using a first balance parameter, a first coherence parameter or a first time difference parameter between a first channel pair, and for generating a second balance parameter, a second coherence parameter or a second time parameter between a second channel pair, the balance parameters, coherence parameters or time parameters forming a parameter representation, wherein the first channel pair has two channels, which are different from two channels of the second channel pair, and wherein each channel of the two channel pair is one of the original channels, a weighted or unweighted combination of the original channels, a downmix channel, or a weighted or unweighted combination of at least two downmix channels, and wherein the first channel pair and the second channel pair include information on the three original channels, and the method furthermore using parameter scheme control information signalling a parameter scheme selected for a signal segment, the method comprising:

generating a number of up-mix channels, the number of up-mix channels being greater than the number of base channels and smaller than or equal to a number of original channels, wherein the step of generating is controlled such that the selected parameter scheme indicated by a parameter scheme control is applied for the signal segment, wherein the step of generating includes generating reconstructed channels based on information on the downmixing scheme and using the balance parameters, the coherence parameters, or the inter-channel time differences such that a balance or coherence or inter-channel time difference between a first channel pair is determined based on the first balance parameter, the first inter-channel coherence parameter, or the first inter-channel time difference, and a balance, an inter-channel coherence, or an inter-channel level difference between a second channel pair is determined based on the second balance parameter, the second inter-channel coherence parameter, or the second inter-channel time difference parameter.

19. Non-transitory computer readable medium storing a computer program having machine-readable instructions for performing a method in accordance with claim 17 or 18, when running on a computer.

* * * * *